US012604319B2

(12) United States Patent
Xu et al.

(10) Patent No.: US 12,604,319 B2
(45) Date of Patent: Apr. 14, 2026

(54) INDICATION OF UNUSED RESOURCE FOR UPLINK TRANSMISSION

(71) Applicant: QUALCOMM Incorporated, San Diego, CA (US)

(72) Inventors: Huilin Xu, Temecula, CA (US); Diana Maamari, San Diego, CA (US); Ahmed Elshafie, San Diego, CA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 561 days.

(21) Appl. No.: 18/159,083

(22) Filed: Jan. 24, 2023

(65) Prior Publication Data

US 2024/0251409 A1    Jul. 25, 2024

(51) Int. Cl.
*H04W 72/20* (2023.01)
*H04W 72/1268* (2023.01)

(52) U.S. Cl.
CPC ....... *H04W 72/20* (2023.01); *H04W 72/1268* (2013.01)

(58) Field of Classification Search
CPC .......................... H04W 72/20; H04W 72/1268
See application file for complete search history.

(56) References Cited

U.S. PATENT DOCUMENTS

| 2011/0116455 A1* | 5/2011 | Damnjanovic | ....... H04L 1/1861 |
| | | | 370/329 |
| 2014/0369245 A1* | 12/2014 | Pecen | ............... H04W 52/0216 |
| | | | 370/311 |
| 2021/0136732 A1* | 5/2021 | Fakoorian | ............. H04W 28/26 |

\* cited by examiner

*Primary Examiner* — Brenda H Pham
(74) *Attorney, Agent, or Firm* — Holland & Hart LLP

(57) ABSTRACT

Methods, systems, and devices for wireless communications are described. A user equipment may receive control signaling that includes a first parameter that indicates a first quantity of symbol groups and a second parameter that indicates a second quantity of resource block groups. The UE may receive a grant allocating periodic resources for transmitting a set of transport blocks. The UE may transmit a feedback message indicating whether resources of the grant are unused by the UE to transmit one or more transport blocks of the set of transport blocks, the feedback message generated according with the first parameter and the second parameter of the control signaling. The feedback message may include a set of values, where each value may correspond to a respective symbol group and resource group (e.g., a resource group pair).

30 Claims, 17 Drawing Sheets

105-a

215

210

205

115-a

▨ Control Signaling 205

▨ Grant 210

▨ Feedback Message 215

200

505  Control Signaling

510  Grant allocating Resources for Transport Blocks

515  Generate Resource Map

Feedback Message

520

105-b 115-b

500

1010

1020

1015

1005

1000

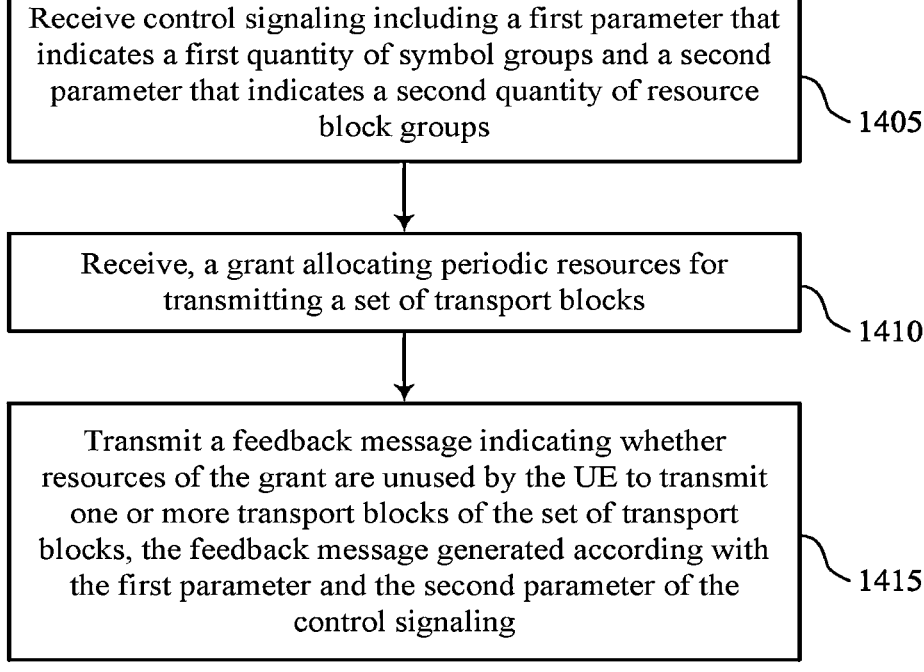

Receive control signaling including a first parameter that indicates a first quantity of symbol groups and a second parameter that indicates a second quantity of resource block groups

1405

Receive, a grant allocating periodic resources for transmitting a set of transport blocks

1410

Transmit a feedback message indicating whether resources of the grant are unused by the UE to transmit one or more transport blocks of the set of transport blocks, the feedback message generated according with the first parameter and the second parameter of the control signaling

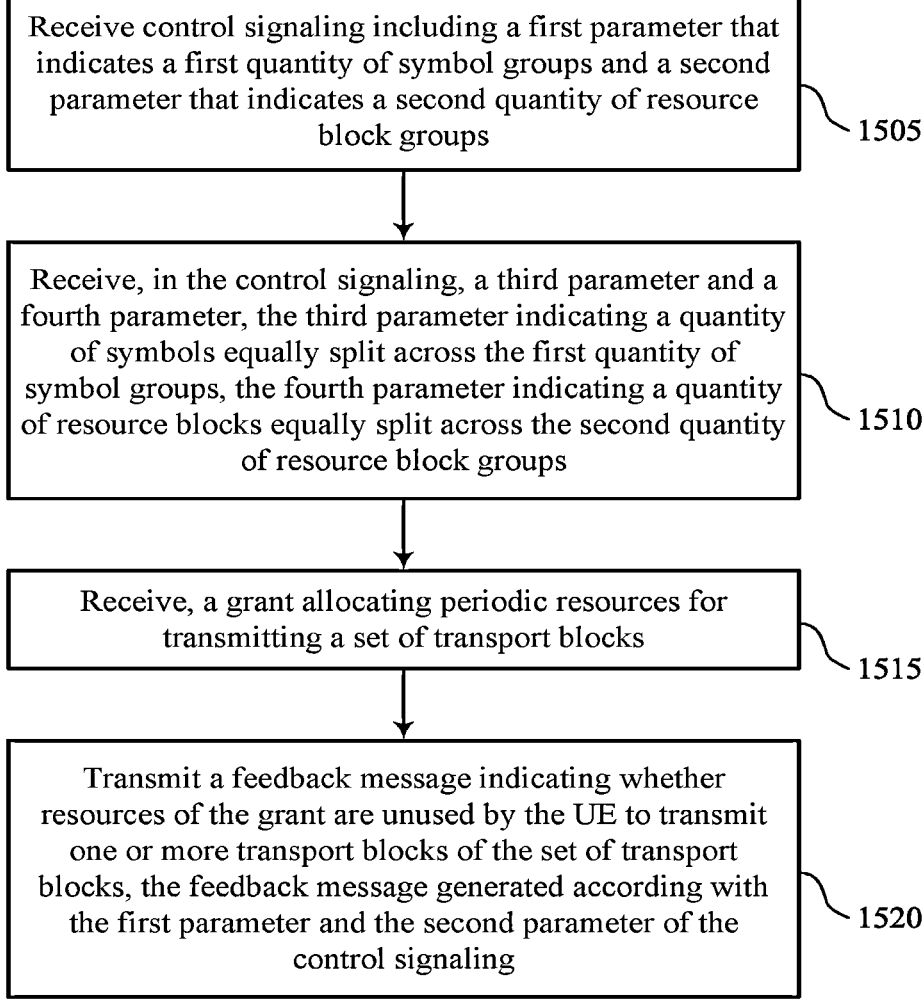

Receive control signaling including a first parameter that indicates a first quantity of symbol groups and a second parameter that indicates a second quantity of resource block groups

1505

Receive, in the control signaling, a third parameter and a fourth parameter, the third parameter indicating a quantity of symbols equally split across the first quantity of symbol groups, the fourth parameter indicating a quantity of resource blocks equally split across the second quantity of resource block groups

1510

Receive, a grant allocating periodic resources for transmitting a set of transport blocks

1515

Transmit a feedback message indicating whether resources of the grant are unused by the UE to transmit one or more transport blocks of the set of transport blocks, the feedback message generated according with the first parameter and the second parameter of the control signaling

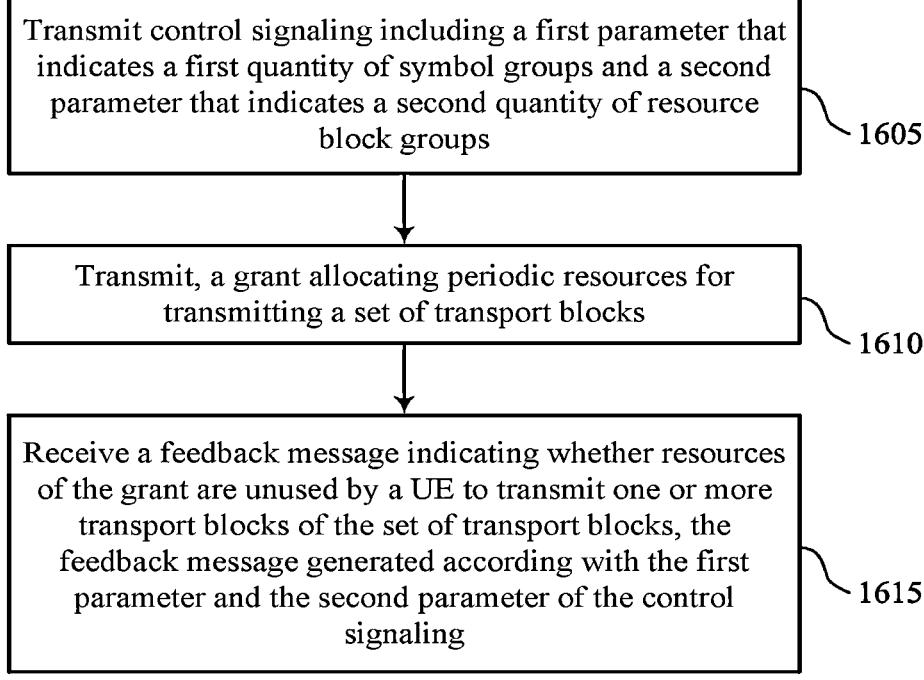

Transmit control signaling including a first parameter that indicates a first quantity of symbol groups and a second parameter that indicates a second quantity of resource block groups

1605

Transmit, a grant allocating periodic resources for transmitting a set of transport blocks

1610

Receive a feedback message indicating whether resources of the grant are unused by a UE to transmit one or more transport blocks of the set of transport blocks, the feedback message generated according with the first parameter and the second parameter of the control signaling

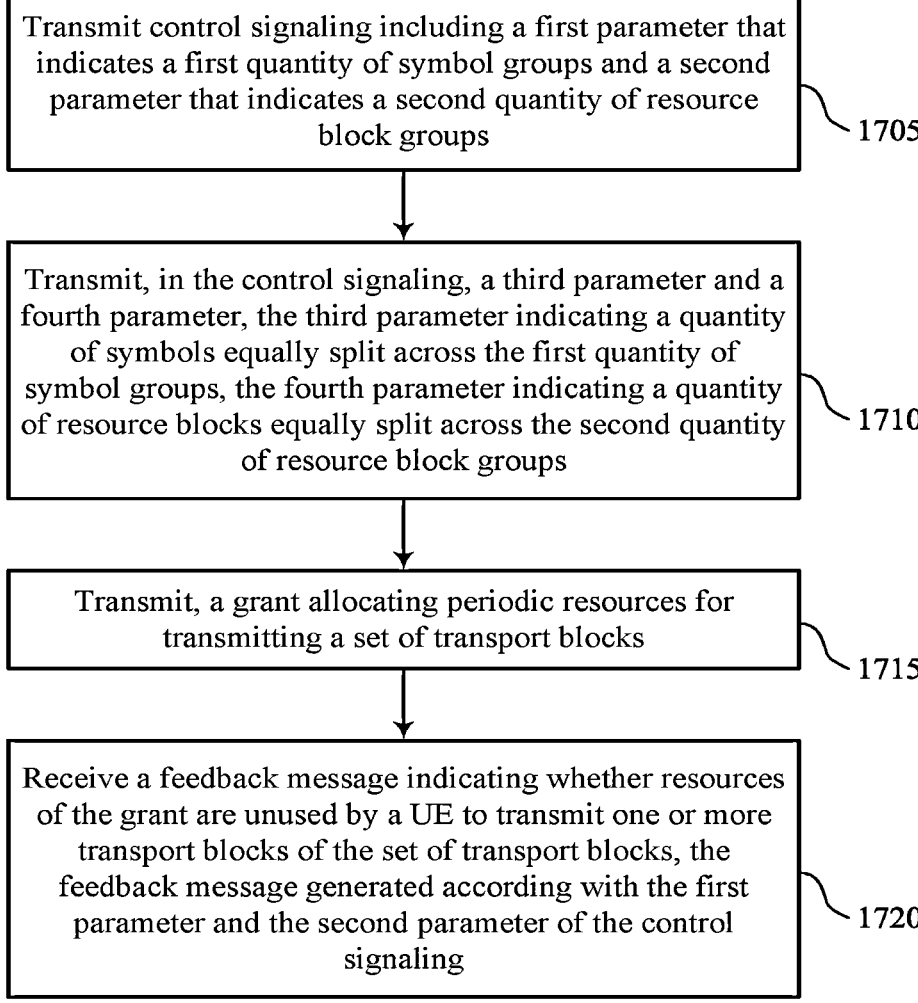

Transmit control signaling including a first parameter that indicates a first quantity of symbol groups and a second parameter that indicates a second quantity of resource block groups

1705

Transmit, in the control signaling, a third parameter and a fourth parameter, the third parameter indicating a quantity of symbols equally split across the first quantity of symbol groups, the fourth parameter indicating a quantity of resource blocks equally split across the second quantity of resource block groups

1710

Transmit, a grant allocating periodic resources for transmitting a set of transport blocks

1715

Receive a feedback message indicating whether resources of the grant are unused by a UE to transmit one or more transport blocks of the set of transport blocks, the feedback message generated according with the first parameter and the second parameter of the control signaling

INDICATION OF UNUSED RESOURCE FOR UPLINK TRANSMISSION

FIELD OF TECHNOLOGY

The following relates to wireless communications, including indication of unused resource for uplink transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support indication of unused resource for uplink transmission. A network entity may allocate periodic uplink resources to a user equipment (UE) to be used without explicit grants from the network entity (e.g., using a configured grant). The described techniques provide for a UE and the network entity to communicate which uplink resources are unused by the UE. To facilitate such communication, the UE may receive control signaling that indicates a first quantity of symbol groups (e.g., that include a quantity of symbols) and a second parameter that indicates a second quantity of resource block (RB) groups (e.g., that include a quantity of RBs). The UE may use the indication of the first quantity of symbol groups and the second quantity of RB groups to generate a resource map that indicates used and unused uplink resources. For example, the UE may receive a grant (e.g., a configured grant) allocating resources for a set of physical uplink shared channel (PUSCH) occasions.

As such, the UE may map the resources indicated in the grant to the first quantity of symbol groups and the second quantity of RB groups, where each resource of the grant is mapped to one symbol group and one RB group (e.g., a resource group pair). In some examples, each symbol group and RB group pair may be associated with a respective index of the resource map. As such, the UE may transmit via feedback message, a set of values where each value corresponds to a respective index of the resource map. The network entity may use the values to determine whether resources of a resource group pair are used or unused by the UE. In some cases, the network entity may reallocate the resources within an unused PUSCH occasion. For example, the network entity may reallocate the unused resources for downlink messaging with the UE or reallocate the resources for communications with a second UE (e.g., downlink or uplink messaging).

A method for wireless communications is described. The method may include receiving control signaling including a first parameter that indicates a first quantity of symbol groups and a second parameter that indicates a second quantity of RB groups, receiving, a grant allocating periodic resources for transmitting a set of transport blocks, and transmitting a feedback message indicating whether resources of the grant are unused by the UE to transmit one or more transport blocks of the set of transport blocks, the feedback message generated according with the first parameter and the second parameter of the control signaling.

An apparatus for wireless communications is described. The apparatus may include a processor, memory coupled with the processor, and instructions stored in the memory. The instructions may be executable by the processor to cause the apparatus to receive control signaling including a first parameter that indicates a first quantity of symbol groups and a second parameter that indicates a second quantity of RB groups, receive, a grant allocating periodic resources for transmitting a set of transport blocks, and transmit a feedback message indicating whether resources of the grant are unused by the UE to transmit one or more transport blocks of the set of transport blocks, the feedback message generated according with the first parameter and the second parameter of the control signaling.

Another apparatus for wireless communications is described. The apparatus may include means for receiving control signaling including a first parameter that indicates a first quantity of symbol groups and a second parameter that indicates a second quantity of RB groups, means for receiving, a grant allocating periodic resources for transmitting a set of transport blocks, and means for transmitting a feedback message indicating whether resources of the grant are unused by the UE to transmit one or more transport blocks of the set of transport blocks, the feedback message generated according with the first parameter and the second parameter of the control signaling.

A non-transitory computer-readable medium storing code for wireless communications is described. The code may include instructions executable by a processor to receive control signaling including a first parameter that indicates a first quantity of symbol groups and a second parameter that indicates a second quantity of RB groups, receive, a grant allocating periodic resources for transmitting a set of transport blocks, and transmit a feedback message indicating whether resources of the grant are unused by the UE to transmit one or more transport blocks of the set of transport blocks, the feedback message generated according with the first parameter and the second parameter of the control signaling.

In some examples of the method, apparatuses, and non-transitory computer-readable medium described herein, receiving the control signaling may include operations, features, means, or instructions for receiving, in the control signaling, a third parameter and a fourth parameter, the third parameter indicating a quantity of symbols equally split across the first quantity of symbol groups, the fourth parameter indicating a quantity of RBs equally split across the second quantity of RB groups.

In some examples of the method, apparatuses, and non-transitory computer-readable medium described herein, receiving the control signaling may include operations, features, means, or instructions for receiving, in the control signaling, a third parameter and a fourth parameter, the third parameter indicating a respective quantity of symbols included in each symbol group of the first quantity of symbol groups, the fourth parameter indicating a respective quantity of RBs included in each symbol group of the second quantity of RB groups.

In some examples of the method, apparatuses, and non-transitory computer-readable medium described herein, the third parameter included in the control signaling includes a first set of fields, each field of the first set of fields indicating the respective quantity of symbols included in a respective symbol group and the fourth parameter included in the control signaling includes a second set of fields, each field of the second set of fields indicating the respective quantity of RBs included in a respective RB group.

In some examples of the method, apparatuses, and non-transitory computer-readable medium described herein, each value of the feedback message may be associated with a respective index of a resource map between the resources of the grant and values of the feedback message, transmitting the feedback message may include operations, features, means, or instructions for transmitting, in the feedback message, each value of the feedback message associated with the resource map, where the resource map includes a range of RBs.

In some examples of the method, apparatuses, and non-transitory computer-readable medium described herein, receiving the control signaling may include operations, features, means, or instructions for receiving, in the control signaling, an offset for identifying a location of a first RB of the second quantity of RB groups relative to a reference RB.

In some examples of the method, apparatuses, and non-transitory computer-readable medium described herein, each value of the feedback message may be associated with a respective index of a resource map between the resources of the grant and values of the feedback message, transmitting the feedback message may include operations, features, means, or instructions for transmitting, in the feedback message, each value of the feedback message associated with the resource map, where a starting symbol of the resource map may be a quantity of symbols after a last symbol of the feedback message.

In some examples of the method, apparatuses, and non-transitory computer-readable medium described herein, the starting symbol of the resource map may be a first symbol subsequent to a last symbol of the quantity of symbols.

In some examples of the method, apparatuses, and non-transitory computer-readable medium described herein, the starting symbol of the resource map may be a first symbol of a first uplink channel occasion after a last symbol of the quantity of symbols.

In some examples of the method, apparatuses, and non-transitory computer-readable medium described herein, the starting symbol of the resource map may be a first symbol of a first uplink channel occasion associated with a period of the periodic resources after a last symbol of the quantity of symbols.

In some examples of the method, apparatuses, and non-transitory computer-readable medium described herein, receiving the control signaling may include operations, features, means, or instructions for receiving, in the control signaling, an indication of the quantity of symbols.

In some examples of the method, apparatuses, and non-transitory computer-readable medium described herein, each value of the feedback message may be associated with a symbol group of the first quantity of symbol groups and a RB group of the second quantity of RB groups, a value of a first type indicating that the associated symbol group and RB group may be used by the UE to transmit the one or more transport blocks, a value of a second type indicating that the associated symbol group and RB group may be not used by the UE to transmit the one or more transport blocks.

In some examples of the method, apparatuses, and non-transitory computer-readable medium described herein, an uplink channel occasion overlaps with a first symbol group and a first RB group associated with a value of the second type, the value of the second type indicates that the UE does not use any resources of the first RB group during symbols associated with the uplink channel occasion to transmit the one or more transport blocks.

In some examples of the method, apparatuses, and non-transitory computer-readable medium described herein, an uplink channel occasion overlaps with a first symbol group and a first RB group associated with a value of the second type, the value of the second type indicates that the UE does not use the resources of the first RB group in the first symbol group to transmit the one or more transport blocks during the uplink channel occasion.

In some examples of the method, apparatuses, and non-transitory computer-readable medium described herein, an uplink channel occasion overlaps with a first symbol group and a first RB group associated with a value of the second type, the value of the second type indicates that the UE does not use any RBs associated with the first symbol group to transmit the one or more transport blocks.

In some examples of the method, apparatuses, and non-transitory computer-readable medium described herein, an uplink channel occasion overlaps with a first symbol group and a first RB group associated with a value of the second type, the value of the second type indicates that the UE does not use the first RB group to transmit the one or more transport blocks during symbols of the first symbol group.

In some examples of the method, apparatuses, and non-transitory computer-readable medium described herein, an uplink channel occasion overlaps with a first symbol group and a first RB group associated with a value of the second type, the value of the second type indicates that the UE does not use the first RB group or RBs associated with a higher RB index to transmit the one or more transport blocks during symbols of the first symbol group.

In some examples of the method, apparatuses, and non-transitory computer-readable medium described herein, transmitting the feedback message may include operations, features, means, or instructions for transmitting the feedback message via a physical uplink shared channel or a physical uplink control channel.

A method for wireless communications is described. The method may include transmitting control signaling including a first parameter that indicates a first quantity of symbol groups and a second parameter that indicates a second quantity of RB groups, transmitting, a grant allocating periodic resources for transmitting a set of transport blocks, and receiving a feedback message indicating whether resources of the grant are unused by a UE to transmit one or more transport blocks of the set of transport blocks, the feedback message generated according with the first parameter and the second parameter of the control signaling.

An apparatus for wireless communications is described. The apparatus may include a processor, memory coupled with the processor, and instructions stored in the memory. The instructions may be executable by the processor to cause the apparatus to transmit control signaling including a first parameter that indicates a first quantity of symbol groups and a second parameter that indicates a second quantity of RB groups, transmit, a grant allocating periodic resources for transmitting a set of transport blocks, and receive a feedback message indicating whether resources of the grant are unused by a UE to transmit one or more transport blocks of the set of transport blocks, the feedback message generated according with the first parameter and the second parameter of the control signaling.

Another apparatus for wireless communications is described. The apparatus may include means for transmitting control signaling including a first parameter that indicates a first quantity of symbol groups and a second parameter that indicates a second quantity of RB groups, means for transmitting, a grant allocating periodic resources for transmitting a set of transport blocks, and means for receiving a feedback message indicating whether resources of the grant are unused by a UE to transmit one or more transport blocks of the set of transport blocks, the feedback message generated according with the first parameter and the second parameter of the control signaling.

A non-transitory computer-readable medium storing code for wireless communications is described. The code may include instructions executable by a processor to transmit control signaling including a first parameter that indicates a first quantity of symbol groups and a second parameter that indicates a second quantity of RB groups, transmit, a grant allocating periodic resources for transmitting a set of transport blocks, and receive a feedback message indicating whether resources of the grant are unused by a UE to transmit one or more transport blocks of the set of transport blocks, the feedback message generated according with the first parameter and the second parameter of the control signaling.

In some examples of the method, apparatuses, and non-transitory computer-readable medium described herein, transmitting the control signaling may include operations, features, means, or instructions for transmitting, in the control signaling, a third parameter and a fourth parameter, the third parameter indicating a quantity of symbols equally split across the first quantity of symbol groups, the fourth parameter indicating a quantity of RBs equally split across the second quantity of RB groups.

In some examples of the method, apparatuses, and non-transitory computer-readable medium described herein, transmitting the control signaling may include operations, features, means, or instructions for transmitting, in the control signaling, a third parameter and a fourth parameter, the third parameter indicating a respective quantity of symbols included in each symbol group of the first quantity of symbol groups, the fourth parameter indicating a respective quantity of RBs included in each symbol group of the second quantity of RB groups.

In some examples of the method, apparatuses, and non-transitory computer-readable medium described herein, the third parameter included in the control signaling includes a first set of fields, each field of the first set of fields indicating the respective quantity of symbols included in a respective symbol group and the fourth parameter included in the control signaling includes a second set of fields, each field of the second set of fields indicating the respective quantity of RBs included in a respective RB group.

In some examples of the method, apparatuses, and non-transitory computer-readable medium described herein, each value of the feedback message may be associated with a respective index of a resource map between the resources of the grant and values of the feedback message, receiving the control signaling may include operations, features, means, or instructions for receiving, in the feedback message, each value of the feedback message associated with the resource map, where the resource map includes a range of RBs.

In some examples of the method, apparatuses, and non-transitory computer-readable medium described herein, transmitting the control signaling may include operations, features, means, or instructions for transmitting, in the control signaling, an offset for identifying a location of a first RB of the second quantity of RB groups relative to a reference RB.

In some examples of the method, apparatuses, and non-transitory computer-readable medium described herein, each value of the feedback message may be associated with a respective index of a resource map between the resources of the grant and values of the feedback message, receiving the feedback message may include operations, features, means, or instructions for receiving, in the feedback message, each value of the feedback message associated with the resource map, where a starting symbol of the resource map may be a quantity of symbols after a last symbol of the feedback message.

In some examples of the method, apparatuses, and non-transitory computer-readable medium described herein, the starting symbol of the resource map may be a first symbol subsequent to a last symbol of the quantity of symbols.

In some examples of the method, apparatuses, and non-transitory computer-readable medium described herein, the starting symbol of the resource map may be a first symbol of a first uplink channel occasion after a last symbol of the quantity of symbols.

In some examples of the method, apparatuses, and non-transitory computer-readable medium described herein, the starting symbol of the resource map may be a first symbol of a first uplink channel occasion associated with a period of the periodic resources after a last symbol of the quantity of symbols.

BRIEF DESCRIPTION OF THE DRAWINGS

FIGS. 14 through 17 illustrate flowcharts showing methods that support indication of unused resource for uplink transmission in accordance with one or more aspects of the present disclosure.

DETAILED DESCRIPTION

Figure 1:
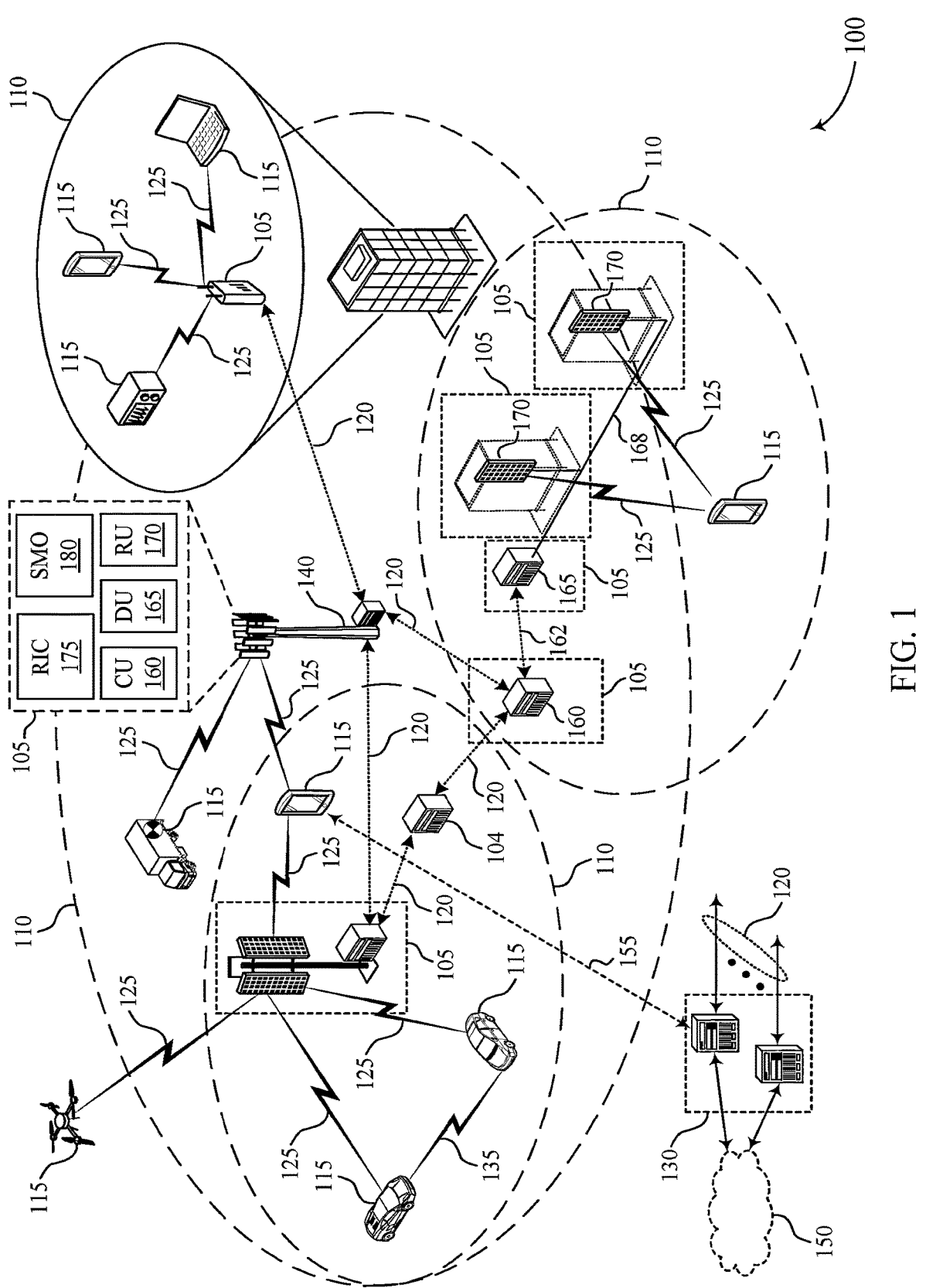
FIG. 1 illustrates an example of a wireless communications system that supports indication of unused resource for uplink transmission in accordance with one or more aspects of the present disclosure.

In some examples of wireless communications, a network entity may configure one or more resources for a user equipment (UE) to use to perform uplink transmissions. For example, the network entity may transmit a grant that may allocate periodic resources for the UE to use for uplink transmissions during multiple physical uplink shared channel (PUSCH) occasions (e.g., using a configured grant). In some cases, the UE may transmit large quantities of data using the periodic resources assigned to the PUSCH occasions (e.g., data such as extended reality (XR) video frames). In some instances, the UE may determine to transmit a quantity of data such that a single PUSCH occasion may not be enough to transmit the data, but multiple PUSCH occasions may carry the data with additional uplink resources unused. Unused resources of periodic resources may result in a decrease in communication efficiency between the UE and network entity. Additionally, a given PUSCH occasion of the periodic resources may span a set of resource blocks (RBs) across a frequency bandwidth. In examples where a UE operates in a sub-band full duplex mode, the UE may not use the full set of RBs in the given PUSCH occasion for an uplink transmission. As such, the unused RBs may further decrease the communication efficiency between the UE and network entity.

The UE and network entity may communicate which resources of the periodic resources are unused by the UE, according to the techniques described herein. For example, the UE may receive control signaling that indicates a first quantity of symbol groups (e.g., that include a quantity of symbols) and a second parameter that indicates a second quantity of RB groups (e.g., that include a quantity of RBs). The UE may use the indication of the first quantity of symbol groups and the second quantity of RB groups to generate a resource map that indicates used and unused uplink resources in a feedback message. For example, the UE may receive a grant allocating the periodic resources for a set of PUSCH occasions. As such, the UE may map the resources indicated in the grant to the first quantity of symbol groups and the second quantity of RB groups, where each resource of the grant is mapped to one symbol group and one RB group (e.g., a resource group pair). In some examples, each symbol group and RB group pair may be associated with a respective index of the resource map. As such, the UE may transmit a feedback message that includes a set of values where each value corresponds to a respective index of the resource map. The network entity may use the values to determine whether resources of a resource group pair are used or unused by the UE. In some cases, the network entity may reallocate the resources within an unused PUSCH occasion. For example, the network entity may reallocate the unused resources for downlink messaging with the UE or reallocate the resources for communications with a second UE (e.g., downlink or uplink messaging).

Aspects of the disclosure are initially described in the context of wireless communications systems. Aspects of the disclosure are further described in the context of signaling diagrams, resource mapping diagrams, and process flows. Aspects of the disclosure are further illustrated by and described with reference to apparatus diagrams, system diagrams, and flowcharts that relate to indication of unused resource for uplink transmission.

FIG. 1 illustrates an example of a wireless communications system 100 that supports indication of unused resource for uplink transmission in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support indication of unused resource for uplink transmission as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples of wireless communications system 100, a network entity 105 may configure one or more resources for a UE 115 to use to perform uplink transmission. For example, the network entity 105 may transmit a grant that may allocate periodic resources for the UE 115 to use for uplink transmissions during multiple PUSCH occasions. In some cases, the UE 115 may transmit large quantities of data using the resources assigned to the PUSCH occasions. In some instances, the UE 115 may determine to transmit a quantity of data such that a single PUSCH occasion may not be enough to transmit the data, but multiple PUSCH occasions may carry the data with additional uplink resources unused. Unused resources of PUSCH occasions may result in a decrease in communication efficiency between the UE 115 and network entity 105. Additionally, a given PUSCH occasion may span a set of RBs across a frequency bandwidth. In examples where a UE 115 operates in a sub-band full duplex mode, the UE 115 may not use the full set of RBs in the given PUSCH occasion for an uplink transmission. As such, the unused RBs may further decrease the communication efficiency between the UE 115 and network entity 105.

The UE 115 and network entity 105 may communicate which uplink resources are unused by the UE 115, according to the techniques described herein. For example, the UE 115 may receive control signaling that indicates a first quantity of symbol groups (e.g., that include a quantity of symbols) and a second parameter that indicates a second quantity of RB groups (e.g., that include a quantity of RBs). The UE 115 may use the indication of the first quantity of symbol groups and the second quantity of RB groups to generate a resource map that indicates used and unused uplink resources. For example, the UE 115 may receive a grant allocating resources for a set of PUSCH occasions. As such, the UE 115 may map the resources indicated in the grant to the first quantity of symbol groups and the second quantity of RB groups, where each resource of the grant is mapped to one symbol group and one RB group (e.g., a resource group pair). In some examples, each symbol group and RB group pair may be associated with a respective index of the resource map. As such, the UE 115 may transmit via feedback message, a set of values where each value corresponds to a respective index of the resource map. The network entity 105 may use the values to determine whether resources of a resource group pair are used or unused by the UE 115. In some cases, the network entity 105 may reallocate the RBs of a symbol within an unused PUSCH occasion. For example, the network entity 105 may reallocate the unused RBs for downlink messaging with the UE 115 or reallocate the RBs for communications with a second UE 115 (e.g., downlink or uplink messaging).

Figure 2:
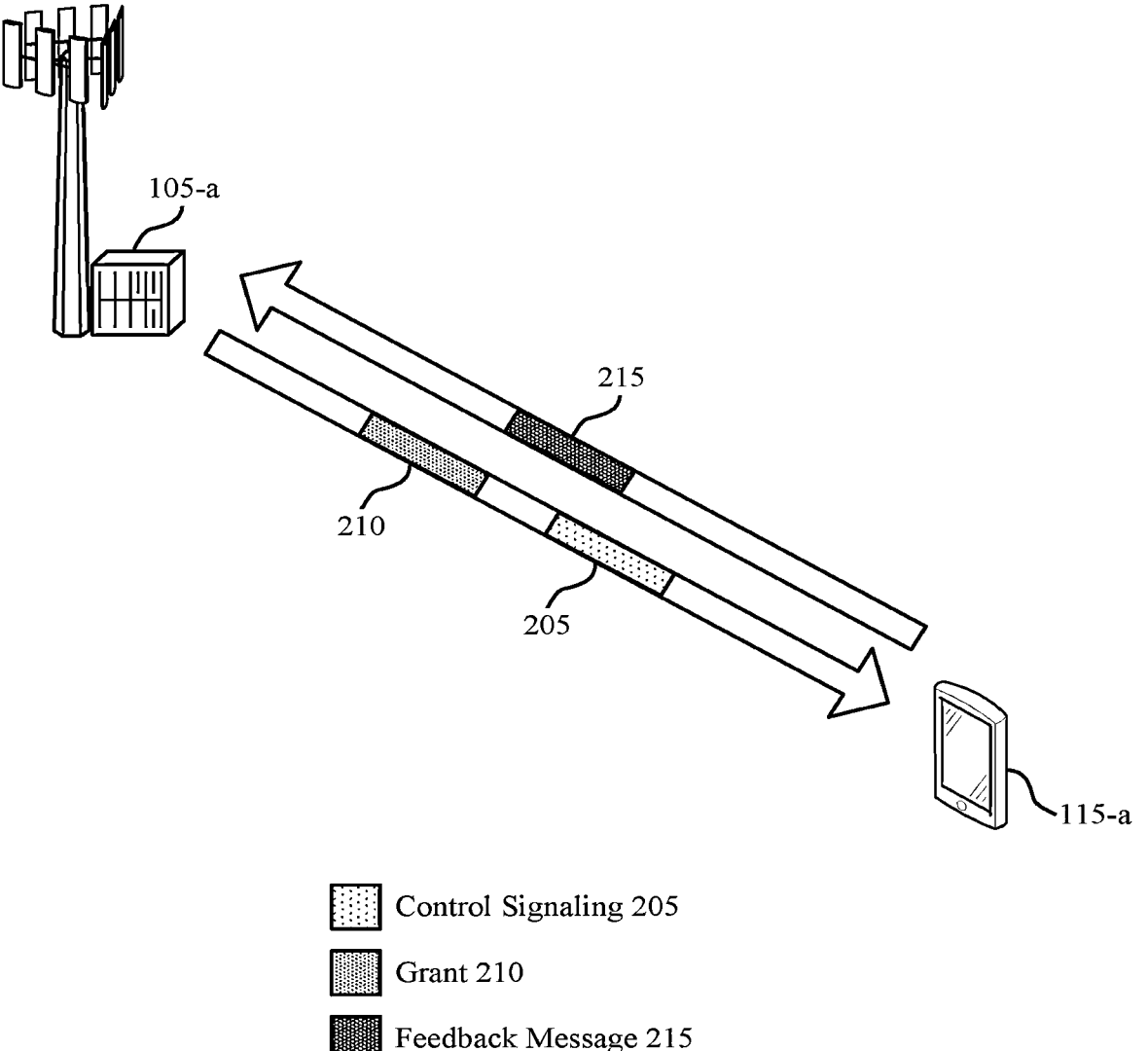
FIG. 2 illustrates an example of wireless communications system that supports indication of unused resource for uplink transmission in accordance with one or more aspects of the present disclosure.

FIG. 2 illustrates an example of a wireless communications system 200 that supports indication of unused resource for uplink transmission in accordance with one or more aspects of the present disclosure. In some examples, wireless communications system 200 may implement or be implemented by one or more aspects of wireless communications system 100. For example, wireless communications system 200 may include a network entity 105-a and a UE 115-a, which may be examples of a network entity 105 and a UE 115, as described with reference to FIG. 1. In some examples, the UE 115-a may use the techniques described herein to indicate to the network entity 105-a of one or more uplink resources that may be unused at the UE 115-a.

As illustrated in FIG. 2, the UE 115-a may receive a grant 210 from the network entity 105-a. In some examples, the grant 210 may allocate periodic resources for the UE 115-a to use for uplink transmissions during a PUSCH occasion. In some examples, the grant 210 may be an example of a configured grant. Additionally, or alternatively, a single grant 210 may allocate, at the UE 115-a, multiple PUSCH occasions for a single grant period (e.g., a configured grant period). As such, wireless communications system 200 may support multiple configured grant PUSCH transmission occasions in a period of a single configured grant PUSCH configuration.

In some cases, the UE 115-*a* may use the multiple PUSCH occasions scheduled for the single grant 210 period to transmit large quantities of data. For instance, the UE 115-*a* may transmit XR uplink video frames, where each frame may have a variable data size dependent on content included in the frame and the compression algorithm used to compress the frame. As such, an XR video frame may have a data size such that a single PUSCH occasion may not be large enough to transmit the video frame, but multiple PUSCH occasions may carry the video frame with additional uplink resources unused. Unused resources of PUSCH occasions may result in a decrease in communication efficiency between the UE 115-*a* and network entity 105-*a*.

Additionally, or alternatively, a given PUSCH occasion may span a set of RBs across a frequency bandwidth. In examples where a UE 115-*a* operates in a sub-band full duplex mode, the UE 115-*a* may not use the full set of RBs in the given PUSCH occasion for an uplink transmission. As such, the unused RBs may further decrease the communication efficiency between the UE 115-*a* and network entity 105-*a* because the RBs could be used for downlink transmissions. Further discussion and illustrations of unused symbols and RBs are described herein, including with reference to FIGS. 3 and 4.

As such, the UE 115-*a* and network entity 105-*a* may communicate which PUSCH resources are unused by the UE 115-*a*, according to the techniques described herein. The UE 115-*a* may transmit a feedback message to the network entity 105-*a* that communicate which resources are unused by the UE 115-*a*. To improve the efficacy of the feedback message, the network entity 105-*a* and the UE 115-*a* may establish a mapping between the values of the feedback message and the resources of the PUSCH occasions that are being indicated by the values of the feedback message. For example, the network entity 105-*a* may transmit control signaling (e.g., RRC signaling) to establish the structure of such feedback messages and the relationship between the values of the feedback message and the resources in the configured grant. For example, the UE 115-*a* may receive control signaling 205 from the network entity 105-*a*. In some examples, the control signaling 205 may include a first parameter that indicates a first quantity of symbol groups and a second parameter that indicates a second quantity of RB groups. Additionally, or alternatively, the control signaling 205 may include a third parameter indicating a quantity of symbols associated with each of the first quantity of symbol groups and a fourth parameter indicating a quantity of RBs associated with each of the second quantity of RB groups. Further discussion of the parameters included in the control signaling 205 are described herein, including with reference to FIGS. 4 and 5.

The UE 115-*a* may use the indication of the first quantity of symbol groups and the second quantity of RB groups to generate a resource map that establishes relationships between the values of the feedback message and the used and unused uplink resources. For example, the UE 115-*a* may receive the grant 210 allocating periodic resources for transmitting a set of transport blocks, where each transport block may be associated with a respective PUSCH occasion of the grant period. As such, the UE 115-*a* may map the resources indicated in the grant 210 to the first quantity of symbol groups and the second quantity of RB groups, where each resource of the grant 210 is mapped to one symbol group and one RB group (e.g., resource group pair). In some examples, each resource group pair may be associated with a respective index of the resource map. A symbol group may include one or more symbols and an RB group may include one or more RBs. Further description of mapping the resources in the resource map are described herein, including with reference to FIG. 4.

Based on generating a resource map in accordance with the parameters of the control signaling 205, the UE 115-*a* may identify which resource group pair include unused resources. In some examples, the UE 115-*a* may assign a value (e.g., a bit value) to each respective index of the resource map. A value of a first type (e.g., bit value of '1' or '0') may indicate that the associated symbol group and RB group are used by the UE 115-*a* to transmit the one or more transport blocks of the grant 210. A value of a second type (e.g., a bit value opposite of the first value type) may indicate that the associated symbol group and RB group are unused by the UE 115-*a* to transmit the one or more transport blocks of the grant 210.

As such, the UE 115-*a* may transmit in a feedback message 215, the set of values associated with each index of the resource map. The network entity 105-*a* may receive the feedback message 215 and determine which resources are unused by the UE 115-*a* based on the values in the feedback message 215 that correspond to the resource map. As such, the network entity 105-*a* may refrain from blind decoding the resources of the PUSCH occasions that the UE 115-*a* has indicated as unused. By operating using the techniques described herein, the network entity 105-*a* may reduce power consumption for blind decoding resources unused resources.

Additionally, or alternatively, the network entity 105-*a* may reallocate the unused resources. In some examples, the network entity 105-*a* may reallocate the resources as downlink resources for the UE 115-*a*. In some examples, the network entity 105-*a* may reallocate the resources for a second UE 115 different from the UE 115-*a* (e.g., for uplink resources or downlink resources). By reallocating resources, the wireless communications system 200 may benefit from an increase in efficiency of resource management.

Figure 3:
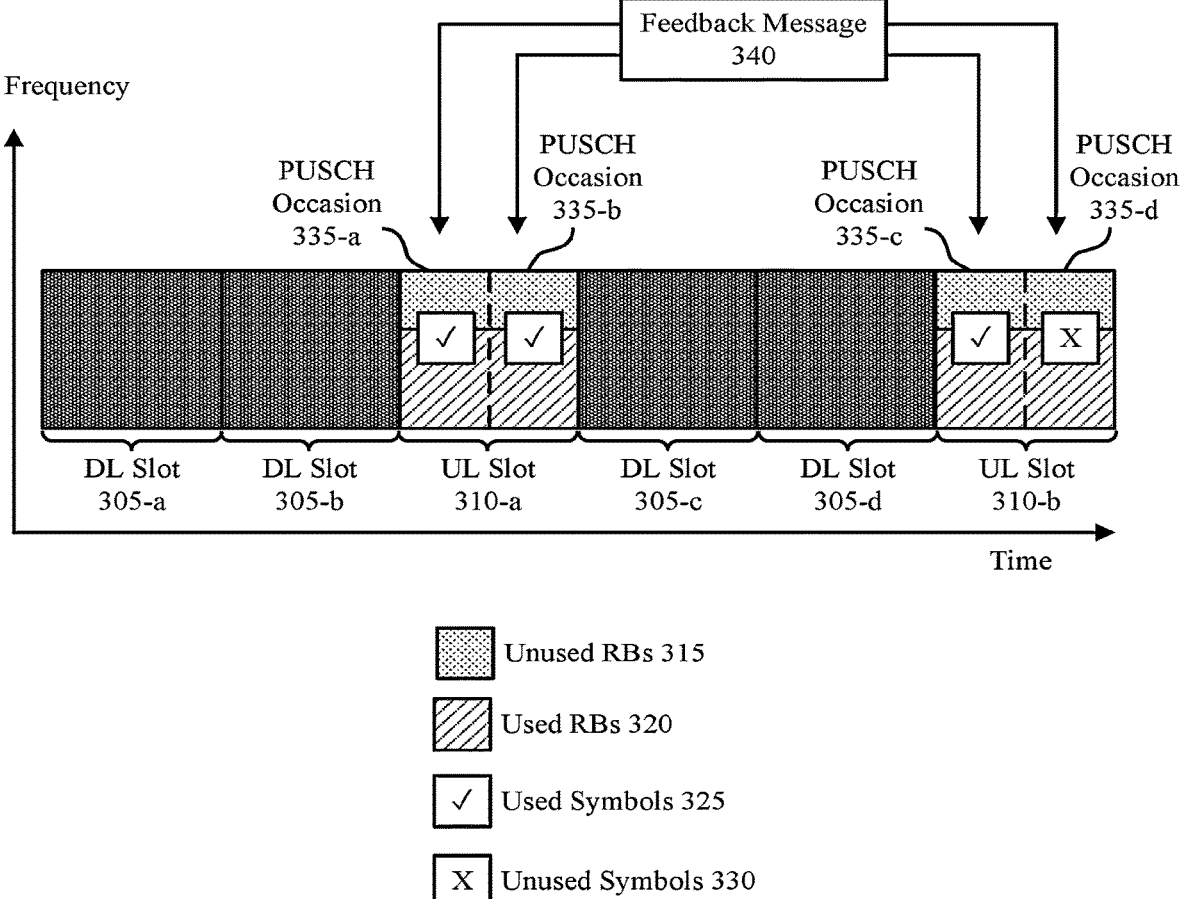
FIG. 3 illustrates an example of a signaling diagram that supports indication of unused resource for uplink transmission in accordance with one or more aspects of the present disclosure.

FIG. 3 illustrates an example of a signaling diagram 300 that supports indication of unused resource for uplink transmission in accordance with one or more aspects of the present disclosure. In some examples, signaling diagram 300 may implement or be implemented by one or more aspects of wireless communications systems 100 and 200. For example, signaling diagram 300 may illustrate a set of resources indicated in the grant 210 that a network entity 105 transmits to a UE 115. The grant may indicate a set of downlink slots 305 and/or a set of uplink slots 310. As described with reference to FIG. 2, the uplink slots 310 may include multiple PUSCH occasions 335 for a single configured grant period.

In the example of FIG. 3, the configured grant period may span two uplink slots (e.g., uplink slot 310-*a* and 310-*b*) and four downlink slots (e.g., downlink slot 305-*a*, 305-*b*, 305-*c*, and 305-*d*). Each of the downlink slots 305 and uplink slots 310 may include a set of RBs that span a frequency bandwidth and a set of symbols that span time. Additionally, FIG. 3 illustrates that the configured grant period includes four PUSCH occasions 335, where uplink slot 310-*a* may be associated with two PUSCH occasions 335 (e.g., PUSCH occasion 335-*a* and 335-*b*) and uplink slot 310-*b* may be associated with two PUSCH occasions 335 (e.g., PUSCH occasion 335-*c* and 335-*d*). In some cases, a UE 115 may transmit a PUSCH in a mini-slot (e.g., a sub-slot of an uplink slot 310), as illustrated in FIG. 3. In some cases, mini-slot PUSCH transmissions may increase resource granularity. It is understood that a configured grant period may span any quantity of downlink slots 305 and uplink slots 310, and that each uplink slot 310 may include any quantity of PUSCH occasions 335.

Based on the quantity of data scheduled for one or more uplink transmissions, the UE 115 may determine that one or more uplink resources of uplink slot 310-a and 310-b may be unused. For example, as illustrated in FIG. 3, the UE 115 may determine that PUSCH occasions 335-a through 335-c may include symbols 325 that may be used and PUSCH occasion 335-d includes unused symbols 330. Additionally, or alternatively, the UE 115 may determine that one or more RBs of the PUSCH occasions 335 are unused. For example, the UE 115 may operate in a sub-band full duplex mode, where the UE 115 may dynamically split RBs of slot into a first set of RBs for downlink reception and a second set of RBs for uplink reception. As such, a PUSCH occasion 335 may include unused RBs 315 (e.g., RBs used for a downlink channel, such as a physical downlink shared channel (PDSCH) or a physical downlink control channel (PDCCH)) and used RBs 320 (e.g., RBs used during a PUSCH occasion 335).

According to the techniques described herein, the UE 115 may transmit a feedback message 340 (e.g., feedback message 215, with reference to FIG. 2) to the network entity 105. The feedback message 340 may indicate the unused RBs 315, the used RBs 320, the used symbols 325, and the unused symbols 330 for the uplink slots 310 indicated in the grant. Further discussion of the information included in the feedback message 340 are described herein, including with reference to FIG. 4.

Figure 4:
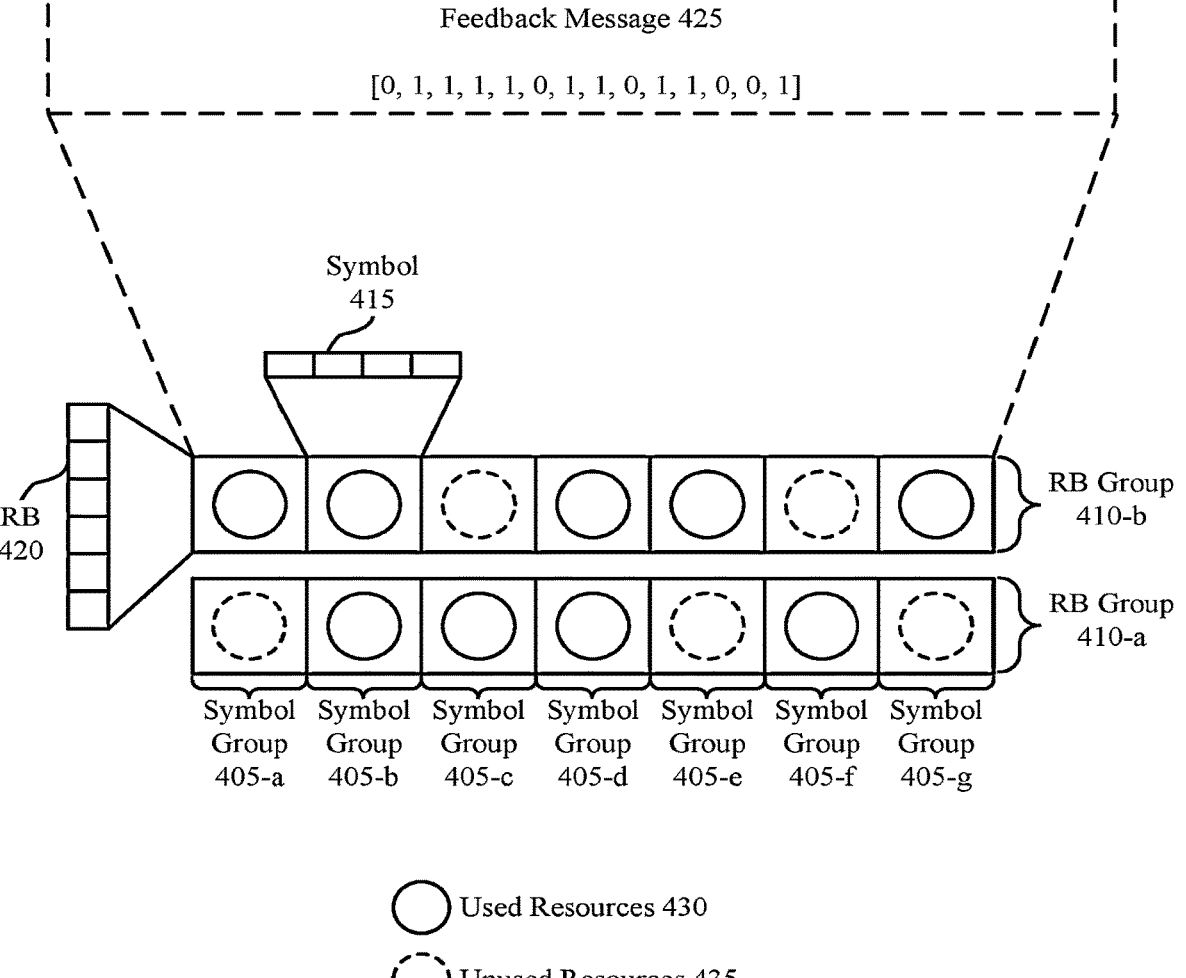
FIG. 4 illustrates an example of a resource mapping diagram that supports indication of unused resource for uplink transmission in accordance with one or more aspects of the present disclosure.

FIG. 4 illustrates an example of a resource mapping diagram 400 that supports indication of unused resource for uplink transmission in accordance with one or more aspects of the present disclosure. In some examples, resource mapping diagram 400 may implement or be implemented by one or more aspects of wireless communications system 100, wireless communications system 100, and signaling diagram 300. For example, resource mapping diagram 400 illustrates a set of uplink resources configured for use at a UE 115 via a grant 210, with reference to FIG. 2. Additionally, resource mapping diagram 400 may illustrate how the UE 115 indicates whether resources corresponding to a symbol group 405 and an RB group 410 pair (e.g., a resource group pair) are used or unused by the UE 115. In some examples, the UE 115-a may use the techniques described herein to indicate a set of values associated with the resource mapping diagram 400 in a feedback message 425. The UE 115 may transmit the feedback message via a PUSCH or a physical uplink control channel (PUCCH).

As illustrated in FIG. 4, the resource mapping diagram may include a quantity of symbol groups 405 (e.g., symbol group 405-a, 405-b, 405-c, 405-d, 405-e, 405-f, and 405-g) and a quantity of RB groups 410 (e.g., RB group 410-a and 410-b). In some examples, each symbol group 405 may include a set of respective symbols 415. For example, as illustrated in FIG. 4, symbol group 405-b includes four symbols 415. However, a symbol group 405 may include any quantity of symbols (e.g., 1, 2, 3, 4, 5, 6, 7, 8, 9, 10, 11, 12, 13, 14 symbols etc.). Additionally, each RB group 410 may include a set of respective RBs 420 that span a portion of the frequency bandwidth. For example, as illustrated in FIG. 4, RB group 410-b includes 6 RBs. However, an RB group 410 may include any quantity of RBs (e.g., 1, 2, 3, 4, 5, 6, 7, 8, 9, 10, 11, 12 RBs etc.). Thus, the resource mapping diagram 400 may be associated with any quantity of symbol groups 405 and any quantity of RB groups 410, each if those groups respectively including any quantity of symbols 415 and any quantity of RBs 420.

In some examples, a network entity 105 may configure the total quantity of symbol groups 405 and the total quantity of symbols 415. For example, the network entity 105 may transmit control signaling (e.g., via control signaling 205, with reference to FIG. 2), that includes a first parameter that indicates a first quantity of symbol groups 405 (e.g., seven, in the example FIG. 4). In some examples, the control signaling may also include a third parameter associated with a total quantity of symbols 415. In some cases, the third parameter may indicate the total quantity of symbols 415, such that the symbols 415 may be equally split across the symbol groups 405. In such cases, with reference to FIG. 4, the third parameter may indicate 28 total symbols 415 equally split across the seven symbol groups 405 (e.g., four symbols 415 per symbol group 405). In some cases, the third parameter may indicate a size of each symbol group 405 (e.g., a quantity of symbols 415 for each symbol group 405). In such cases, the third parameter may include a first set of fields, where each field of the first set of fields indicates a respective quantity of symbols 415 included in a respective symbol group 405. Applying respective quantities of symbols 415 to respective symbol groups 405 may allow for the different symbols groups 405 to match with a duration of the PUSCH occasions.

Additionally, or alternatively, the network entity 105 may configure the total quantity of RB groups 410 and the total quantity of RBs 420. For example, the network entity 105 may include in the control signaling, a second parameter that indicates a second quantity of RB groups 410 (e.g., two, in the example FIG. 4). In some examples, the control signaling may also include a fourth parameter associated with a total quantity of RBs 420. In some cases, the fourth parameter may indicate the total quantity of RBs 420, such that the RBs 420 may be equally split across the RB groups 410. In such cases, with reference to FIG. 4, the fourth parameter may indicate 12 total RBs 420 equally split across the two RB groups 410 (e.g., six RBs 420 per RB group 410). In some cases, the fourth parameter may indicate a size of each RB group 410 (e.g., a quantity of RBs 420 for each RB group 410). In such cases, the fourth parameter may include a second set of fields, where each field of the second set of fields indicates a respective quantity of RBs 420 included in a respective RB group 410. Applying respective quantities of RBs 420 to respective RB groups 410 may allow for the different RB groups 410 to have different uplink frequency bandwidths. In some examples, the control signaling may be an example of RRC signaling.

Based on identifying the quantity of symbol groups 405 and RB groups 410, the UE 115 may generate a resource map, where a given symbol group 405 and RB group 410 may be a resource group pair corresponding to a respective index of the resource map. For example, with reference to resource mapping diagram 400, symbol group 405-a and RB group 410-a may correspond to a first index of the resource map, symbol group 405-a and RB group 410-b may correspond to a second index of the resource map, and so on for each respective resource group pair. As such, the UE 115 may transmit the feedback message 425 that includes a set of values (e.g., a set of bit values), where each value of the set of values may be associated with a respective index of the resource map. In some examples, a first value type may indicate that the corresponding index of the resource map includes resources used by the UE 115 and a second value type may indicate that the corresponding index of the resource map includes resources unused by the UE 115. For example, with reference to FIG. 4, a bit value of '1' may indicate used resources 430 for an index of the resource map and a bit value of '0' may indicate unused resource 435 for an index. It is understood that in other examples, a bit value of '0' may indicate used resources 430 for an index of the resource map and a bit value of '1' may indicate unused resource 435 for an index.

In some cases, the size of the symbol groups 405 may be configured to be the same as the quantity of symbols 415 per PUSCH occasion and the size of RB groups 410 may be configured to cover range of RBs 420 allocated to the UE 115 for an uplink occasion. In such cases, each value of the feedback message may indicate whether a PUSCH occasion in a configured grant period is used or unused.

The resource map indicates the relationships between the values of the feedback message 425 and the resources in associated with a configured grant. The network entity and UE may also determine where the resource map starts to anchor it to specific resources.

In some examples, the range of RBs 420 indicated in the feedback message 425 may be determined by an RB start value (e.g., N) and a frequency reference point (e.g., point A). For example, the first RB 420 in the range of RBs 420 may be N RBs 420 away from the RB 420 indicated by point A. As such, the start value N and the point A may define the range of RBs 420 that span the resource map and the feedback message 425. In some examples, an indication of the start value N and the point A may be indicated in the control signaling. In some examples, the start value N and the point A may be configured at the UE 115.

In some cases, the starting symbol 415 of the resource map may be at least a quantity of symbols (e.g., $T_g$) after a last symbol of the feedback message 425. In some examples, the starting symbol 415 of the resource map may be a first symbol for an uplink transmission that is $T_g$ symbols after the last symbol that the UE 115 transmits the feedback message 425. In some examples, the starting symbol 415 of the resource map is a first symbol of a first PUSCH occasion that is $T_g$ symbols after the last symbol that the UE 115 transmits the feedback message 425. In some examples, starting symbol 415 of the resource map is a first symbol of a first PUSCH occasion of the first configured grant period that is $T_g$ symbols after the last symbol that the UE 115 transmits the feedback message 425. A small $T_g$ (e.g., 0 symbols) may allow the network entity 105 to decrease blind detection of resources for PUSCH transmissions. A large $T_g$ (e.g., a $T_g$ above a configured threshold) may allow a duration of time in which the network entity 105 may re-allocate the unused resources 435. In some examples, the network entity 105 may reallocate the unused resource 435 to a second UE 115. Additionally or alternatively the network entity 105 may allocate the unused resource 435 for one or more downlink transmissions with the UE 115 (e.g., in cases of sub-band full duplex). In some examples, the value of $T_g$ may be configured at the UE 115 via RRC signaling (e.g., included in the control signaling or included in separate RRC signaling). In some examples, the value of $T_g$ may be pre-configured at the UE 115.

In various implementations, the values in the feedback message 425 corresponding to each resource group pair may indicate various information to the network entity 105. For example, the resource map may be generated such that each resource group pair corresponds to a respective PUSCH occasion. In such examples, a bit value of '0' may indicate that the UE 115 may not transmit a PUSCH at least in the RBs 420 in the symbols 415 of the corresponding PUSCH occasion (e.g., one bit indicates all symbols 415 of the PUSCH occasion are unused). Additionally, or alternatively, a bit value of '0' may indicate that the UE 115 may not transmit a PUSCH at least in the RBs 420 in symbols 415 of the symbol group 405 of the resource group pair (e.g., one bit indicates that symbols 415 are unused).

In some cases, the values of feedback message 425 may correspond to resources on a higher granularity than a PUSCH occasion. For example, a bit value may correspond to a resource group pair where a PUSCH occasion overlaps with at least one symbol 415 and at least on RB 420 included in the resource group pair. In on example, a bit value of '0' may indicate that the UE 115 does not transmit a PUSCH in any RB 420 associated with the symbol group 405 of the resource group pair. Additionally, or alternatively, a bit value of '0' may indicate that the UE 115 does not transmit a PUSCH in the RB group 410 of the resource pair. Additionally, or alternatively, a bit value of '0' may indicate that the UE 115 does not transmit a PUSCH in the RB group 410 of the resource pair or any RBs 420 associated with a resource index higher than the RB group 410 of the resource pair. By not using any RBs 420 with the higher resource index, the UE 115 may decrease occurrences of multi-band transmissions of a PUSCH.

Figure 5:
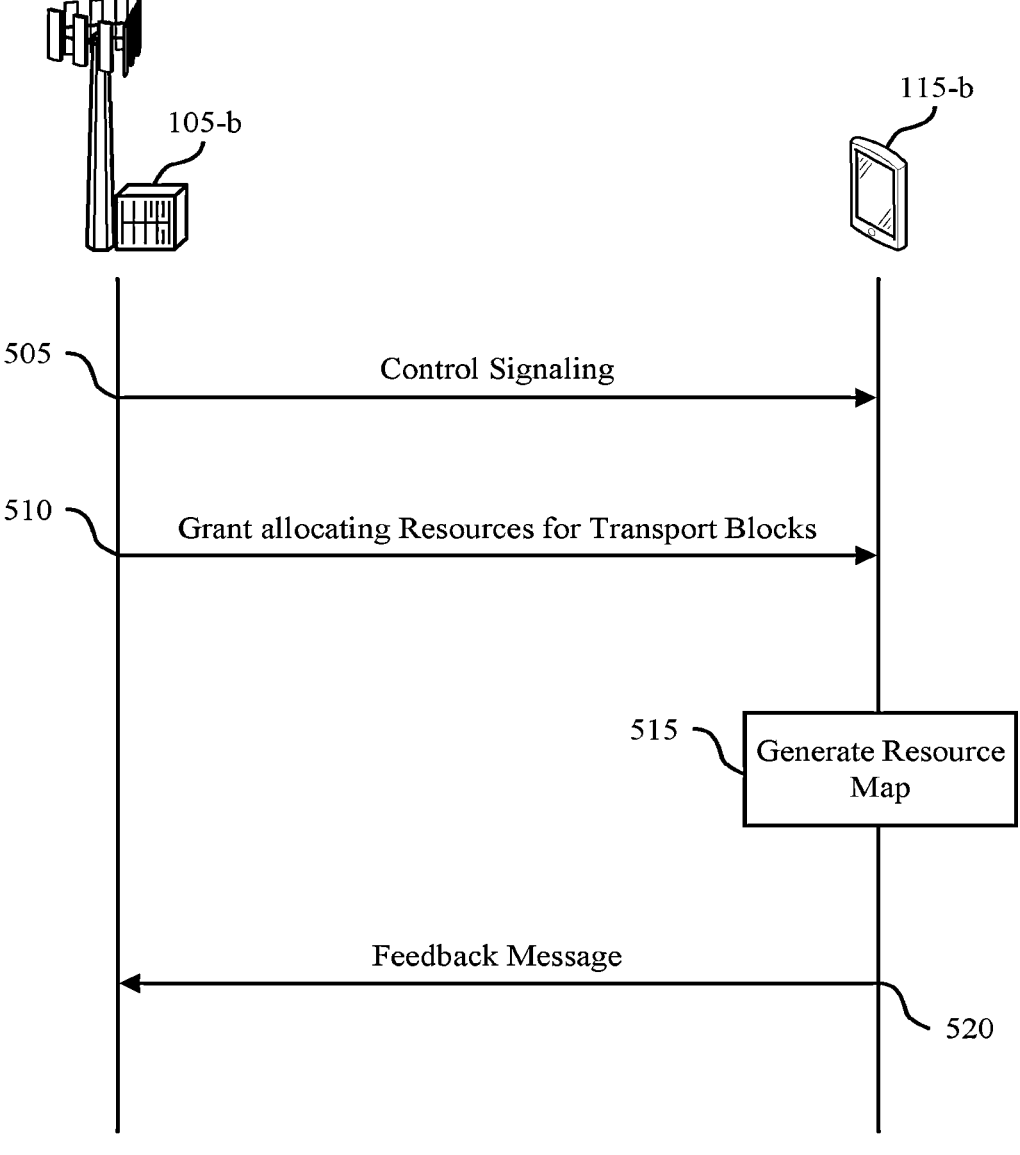
FIG. 5 illustrates an example of a process flow that supports indication of unused resource for uplink transmission in accordance with one or more aspects of the present disclosure.

FIG. 5 illustrates an example of a process flow 500 that supports indication of unused resource for uplink transmission in accordance with one or more aspects of the present disclosure. In some examples, process flow 500 may implement aspects of wireless communications system 100, wireless communications system 200, signaling diagram 300, and resource mapping diagram 400. Process flow 500 includes a UE 115-b and a network entity 105-b which may be respective examples of a UE 115 and a network entity 105, as described with reference to FIGS. 1 through 4. Alternative examples of the following may be implemented, where some steps are performed in a different order than described or are not performed at all. In some cases, steps may include additional features not mentioned below, or further steps may be added. In addition, while process flow 500 shows processes between a single UE 115 and a single network entity 105, these processes may occur between any quantity of network devices and network device types.

At 505, the UE 115-b may receive control signaling including a first parameter that indicates a first quantity of symbol groups and a second parameter that indicates a second quantity of RB groups.

Additionally, the control signaling may include a third parameter and a fourth parameter. In some examples, the third parameter may indicate a quantity of symbols equally split across the first quantity of symbol groups and the fourth parameter may indicate a quantity of RBs equally split across the second quantity of RB groups.

In some other examples, the third parameter may indicate a respective quantity of symbols included in each symbol group of the first quantity of symbol groups and the fourth parameter may indicate a respective quantity of RBs included in each symbol group of the second quantity of RB groups. In such examples, the third parameter may include a first set of fields indicating the respective quantity of symbols included in a respective symbol group, and the fourth parameter may include a second set of fields, each field of the second set of fields indicating the respective quantity of RBs included in a respective RB group.

In some examples, the control signaling may include an offset for identifying a location of a first RB of the second quantity of RBs relative to a reference RB.

At 510, the UE 115-b may receive a grant allocating periodic resources for transmitting a set of transport blocks.

In some examples, the grant may be an example of a configured grant associated with a configured grant period, where the transport blocks may be associated with a set of PUSCH occasions within the same configured grant period.

At 515, the UE 115-*b* may generate a resource map (e.g., as illustrated in FIG. 4). For example, the resource map may map the set of resources indicated in the grant to resource group pairs (e.g., as described in FIG. 4) based on the parameters included in the control signaling. In some examples, the UE 115-*b* may associate each resource group pair to a respective index of the resource map. In some examples, the resource map may span across a range of RBs based on the first RB and the reference RBs indicated in the control signaling.

In some cases, a starting symbol of the resource map is a quantity of symbols after a last symbol used to transmit a feedback message, at 520 (e.g., $T_g$ symbols, with reference to FIG. 4). In one example, the starting symbol of the resource map is a first symbol subsequent to a last symbol of the quantity of symbols. Additionally, or alternatively, the starting symbol of the resource map is a first symbol of a first uplink channel occasion (e.g., PUSCH occasion) after a last symbol of the quantity of symbols. Additionally, or alternatively, the starting symbol of the resource map is a first symbol of a first uplink channel occasion (e.g., PUSCH occasion) associated with a period of the periodic resources (e.g., configured grant period) after a last symbol of the quantity of symbols. In some examples, the UE 115-*b* may receive an indication of the value of $T_g$ in the control signaling, at 505.

At 520, the UE 115-*b* may transmit a feedback message indicating whether resources of the grant are unused by the UE 115-*b* to transmit one or more transport blocks of the set of transport blocks. In some examples, the feedback message generated according with the first parameter and the second parameter of the control signaling (e.g., in accordance with the generated resource map). In some examples, the feedback message may include a set of values (e.g., bit values) where each value of the set of values corresponds to a respective index of the resource map. In some examples, a value of a first type may indicate that the associated resource group pair are used by the UE 115-*b* to transmit the one or more transport blocks, and a value of a second type may indicate that the associated resource group pair are unused by the UE 115-*b* to transmit the one or more transport blocks. In some examples, the UE 115-*b* may transmit the feedback message via a PUSCH or a PUCCH.

In some examples, if a PUSCH occasion overlaps with a first symbol group and a first RB group associated with a value of the second type, the value of the second type may indicate that the UE 115-*b* does not use any resources of the first RB group during symbols associated with the PUSCH occasion to transmit the one or more transport blocks.

Additionally, or alternatively, if a PUSCH occasion overlaps with a first symbol group and a first RB group associated with a value of the second type, the value of the second type may indicate that the UE 115-*b* does not use the resources of the first RB group in the first symbol group to transmit the one or more transport blocks during the PUSCH occasion.

Additionally, or alternatively, if a PUSCH occasion overlaps with a first symbol group and a first RB group associated with a value of the second type, the value of the second type may indicate that the UE 115-*b* does not use any RBs associated with the first symbol group to transmit the one or more transport blocks.

Additionally, or alternatively, if a PUSCH occasion overlaps with a first symbol group and a first RB group associated with a value of the second type, the value of the second type may indicate that the UE 115-*b* does not use the first RB group to transmit the one or more transport blocks during symbols of the first symbol group.

Additionally, or alternatively, if a PUSCH occasion overlaps with a first symbol group and a first RB group associated with a value of the second type, the value of the second type may indicate that the UE 115-*b* does not use the first RB group or RBs associated with a higher RB index to transmit the one or more transport blocks during symbols of the first symbol group.

Figure 6:
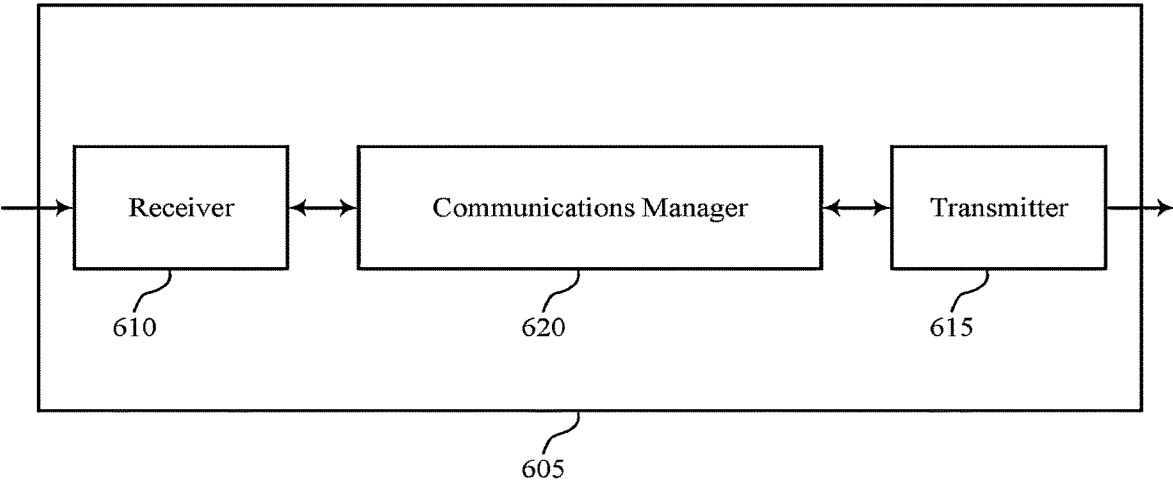
FIGS. 6 and 7 illustrate block diagrams of devices that support indication of unused resource for uplink transmission in accordance with one or more aspects of the present disclosure.

FIG. 6 illustrates a block diagram 600 of a device 605 that supports indication of unused resource for uplink transmission in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to indication of unused resource for uplink transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to indication of unused resource for uplink transmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of indication of unused resource for uplink transmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 may be configured as or otherwise support a means for receiving control signaling including a first parameter that indicates a first quantity of symbol groups and a second parameter that indicates a second quantity of RB groups. The communications manager 620 may be configured as or otherwise support a means for receiving, a grant allocating periodic resources for transmitting a set of transport blocks. The communications manager 620 may be configured as or otherwise support a means for transmitting a feedback message indicating whether resources of the grant are unused by the UE to transmit one or more transport blocks of the set of transport blocks, the feedback message generated according with the first parameter and the second parameter of the control signaling.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
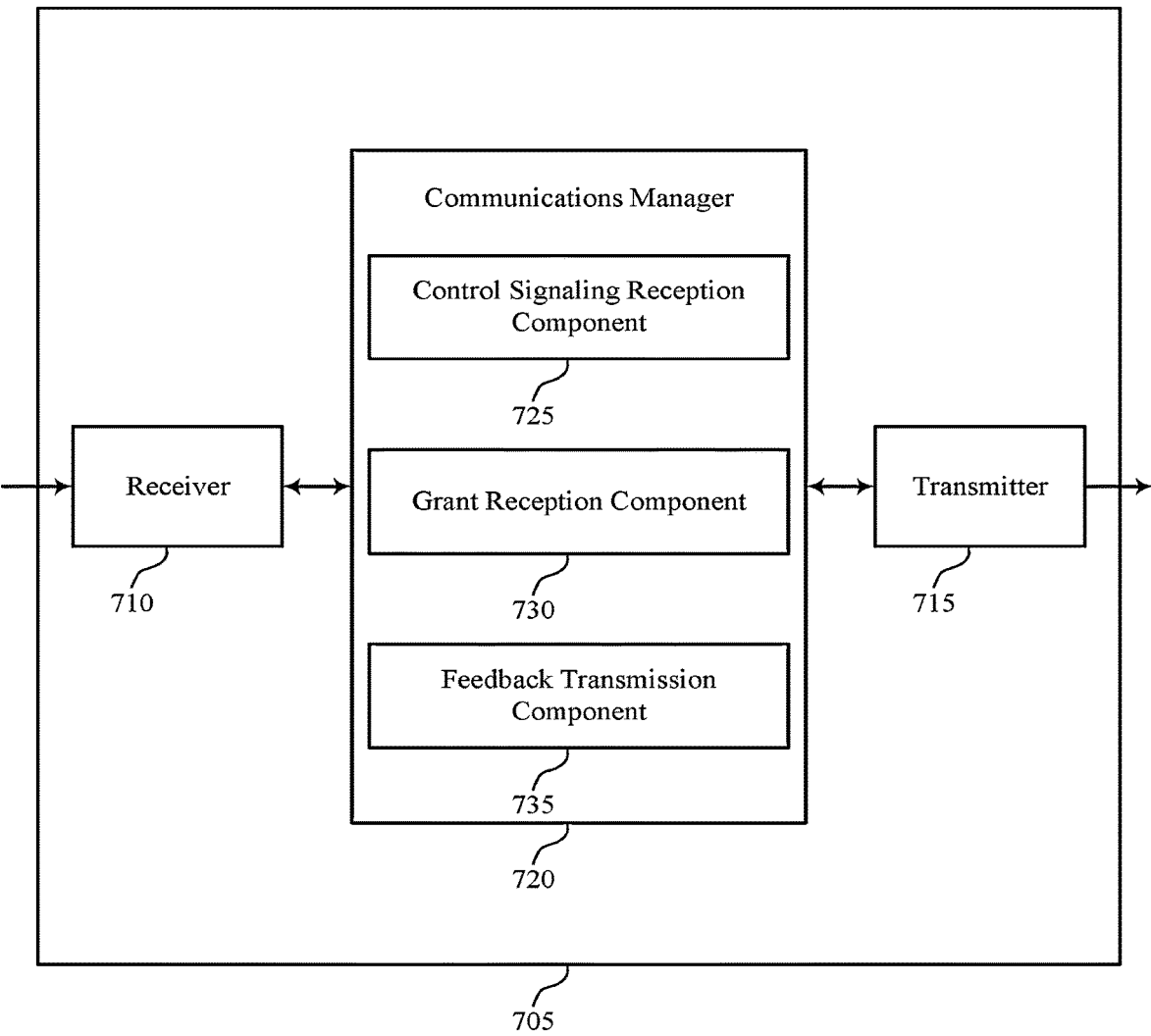

FIG. 7 illustrates a block diagram 700 of a device 705 that supports indication of unused resource for uplink transmission in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to indication of unused resource for uplink transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to indication of unused resource for uplink transmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of indication of unused resource for uplink transmission as described herein. For example, the communications manager 720 may include a control signaling reception component 725, a grant reception component 730, a feedback transmission component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The control signaling reception component 725 may be configured as or otherwise support a means for receiving control signaling including a first parameter that indicates a first quantity of symbol groups and a second parameter that indicates a second quantity of RB groups. The grant reception component 730 may be configured as or otherwise support a means for receiving, a grant allocating periodic resources for transmitting a set of transport blocks. The feedback transmission component 735 may be configured as or otherwise support a means for transmitting a feedback message indicating whether resources of the grant are unused by the UE to transmit one or more transport blocks of the set of transport blocks, the feedback message generated according with the first parameter and the second parameter of the control signaling.

Figure 8:
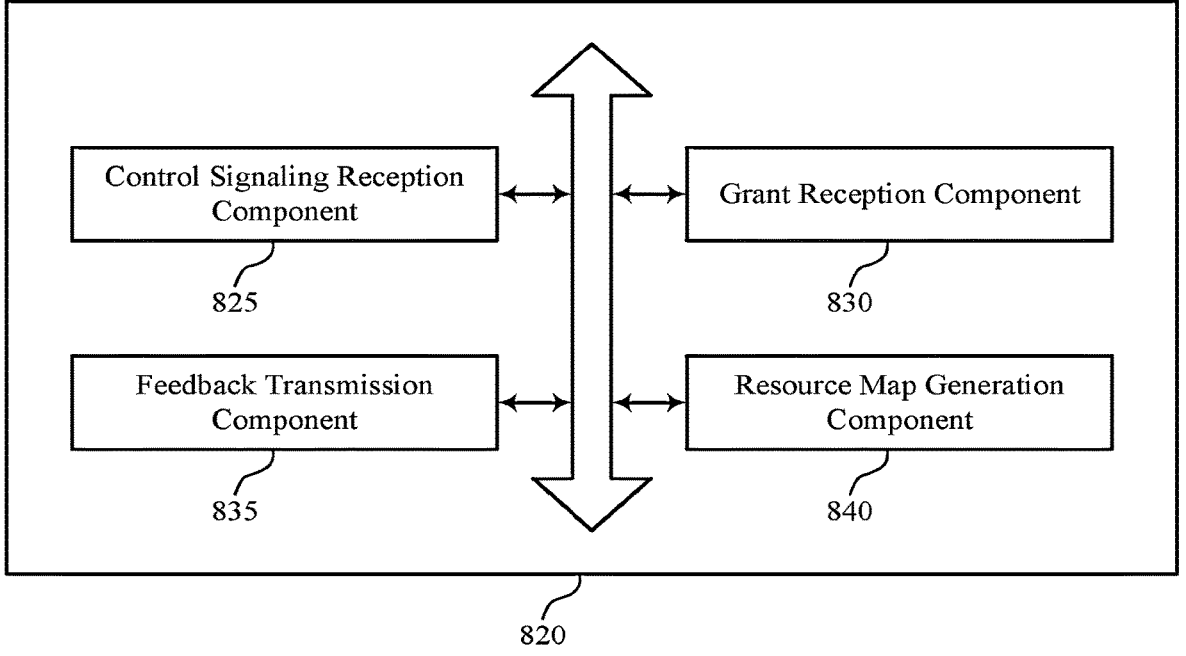
FIG. 8 illustrates a block diagram of a communications manager that supports indication of unused resource for uplink transmission in accordance with one or more aspects of the present disclosure.

FIG. 8 illustrates a block diagram 800 of a communications manager 820 that supports indication of unused resource for uplink transmission in accordance with one or more aspects of the present disclosure. The communications manager 820 may be an example of aspects of a communications manager 620, a communications manager 720, or both, as described herein. The communications manager 820, or various components thereof, may be an example of means for performing various aspects of indication of unused resource for uplink transmission as described herein. For example, the communications manager 820 may include a control signaling reception component 825, a grant reception component 830, a feedback transmission component 835, a resource map generation component 840, or any combination thereof. Each of these components may communicate, directly or indirectly, with one another (e.g., via one or more buses).

The communications manager 820 may support wireless communications in accordance with examples as disclosed herein. The control signaling reception component 825 may be configured as or otherwise support a means for receiving control signaling including a first parameter that indicates a first quantity of symbol groups and a second parameter that indicates a second quantity of RB groups. The grant reception component 830 may be configured as or otherwise support a means for receiving, a grant allocating periodic resources for transmitting a set of transport blocks. The feedback transmission component 835 may be configured as or otherwise support a means for transmitting a feedback message indicating whether resources of the grant are unused by the UE to transmit one or more transport blocks of the set of transport blocks, the feedback message generated according with the first parameter and the second parameter of the control signaling.

In some examples, to support receiving the control signaling, the control signaling reception component 825 may be configured as or otherwise support a means for receiving, in the control signaling, a third parameter and a fourth parameter, the third parameter indicating a quantity of symbols equally split across the first quantity of symbol groups, the fourth parameter indicating a quantity of RBs equally split across the second quantity of RB groups.

In some examples, to support receiving the control signaling, the control signaling reception component 825 may be configured as or otherwise support a means for receiving, in the control signaling, a third parameter and a fourth parameter, the third parameter indicating a respective quantity of symbols included in each symbol group of the first quantity of symbol groups, the fourth parameter indicating a respective quantity of RBs included in each symbol group of the second quantity of RB groups.

In some examples, the third parameter included in the control signaling includes a first set of fields, each field of the first set of fields indicating the respective quantity of symbols included in a respective symbol group. In some examples, the fourth parameter included in the control signaling includes a second set of fields, each field of the second set of fields indicating the respective quantity of RBs included in a respective RB group.

In some examples, to support each value of the feedback message is associated with a respective index of a resource map between the resources of the grant and values of the feedback message, transmitting the feedback message, the resource map generation component 840 may be configured as or otherwise support a means for transmitting, in the feedback message, each value of the feedback message associated with the resource map, where the resource map includes a range of RBs.

In some examples, to support receiving the control signaling, the control signaling reception component 825 may be configured as or otherwise support a means for receiving, in the control signaling, an offset for identifying a location of a first RB of the second quantity of RB groups relative to a reference RB.

In some examples, to support each value of the feedback message is associated with a respective index of a resource map between the resources of the grant and values of the feedback message, transmitting the feedback message, the feedback transmission component 835 may be configured as or otherwise support a means for transmitting, in the feedback message, each value of the feedback message associated with the resource map, where a starting symbol of the resource map is a quantity of symbols after a last symbol of the feedback message.

In some examples, the starting symbol of the resource map is a first symbol subsequent to a last symbol of the quantity of symbols.

In some examples, the starting symbol of the resource map is a first symbol of a first uplink channel occasion after a last symbol of the quantity of symbols.

In some examples, the starting symbol of the resource map is a first symbol of a first uplink channel occasion associated with a period of the periodic resources after a last symbol of the quantity of symbols.

In some examples, to support receiving the control signaling, the control signaling reception component 825 may be configured as or otherwise support a means for receiving, in the control signaling, an indication of the quantity of symbols.

In some examples, each value of the feedback message is associated with a symbol group of the first quantity of symbol groups and a RB group of the second quantity of RB groups, a value of a first type indicating that the associated symbol group and RB group are used by the UE to transmit the one or more transport blocks, a value of a second type indicating that the associated symbol group and RB group are not used by the UE to transmit the one or more transport blocks.

In some examples, an uplink channel occasion overlaps with a first symbol group and a first RB group associated with a value of the second type, the value of the second type indicates that the UE does not use any resources of the first RB group during symbols associated with the uplink channel occasion to transmit the one or more transport blocks.

In some examples, an uplink channel occasion overlaps with a first symbol group and a first RB group associated with a value of the second type, the value of the second type indicates that the UE does not use the resources of the first RB group in the first symbol group to transmit the one or more transport blocks during the uplink channel occasion.

In some examples, an uplink channel occasion overlaps with a first symbol group and a first RB group associated with a value of the second type, the value of the second type indicates that the UE does not use any RBs associated with the first symbol group to transmit the one or more transport blocks.

In some examples, an uplink channel occasion overlaps with a first symbol group and a first RB group associated with a value of the second type, the value of the second type indicates that the UE does not use the first RB group to transmit the one or more transport blocks during symbols of the first symbol group.

In some examples, an uplink channel occasion overlaps with a first symbol group and a first RB group associated with a value of the second type, the value of the second type indicates that the UE does not use the first RB group or RBs associated with a higher RB index to transmit the one or more transport blocks during symbols of the first symbol group.

In some examples, to support transmitting the feedback message, the feedback transmission component 835 may be configured as or otherwise support a means for transmitting the feedback message via a physical uplink shared channel or a physical uplink control channel.

Figure 9:
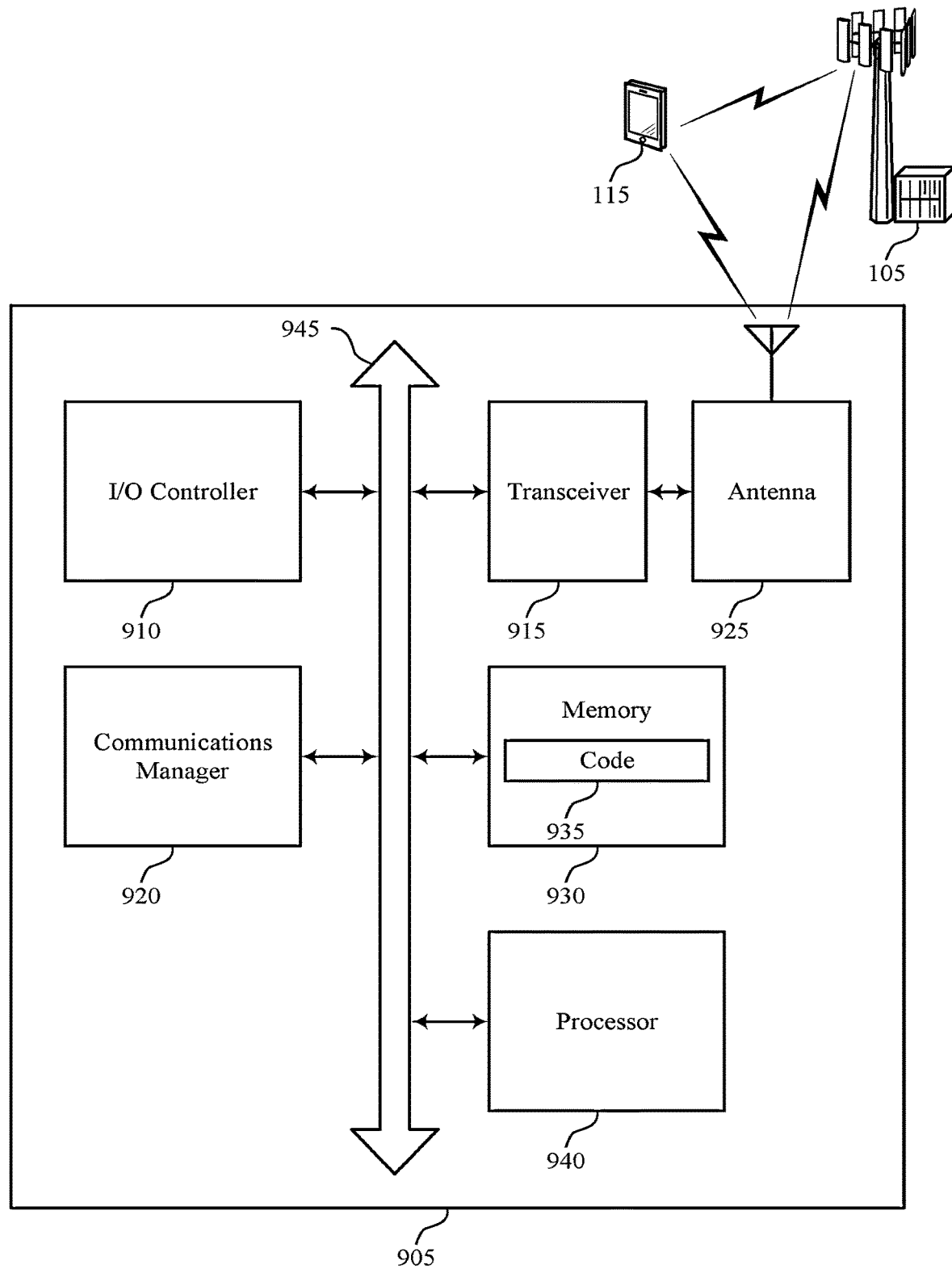
FIG. 9 illustrates a diagram of a system including a device that supports indication of unused resource for uplink transmission in accordance with one or more aspects of the present disclosure.

FIG. 9 illustrates a diagram of a system 900 including a device 905 that supports indication of unused resource for uplink transmission in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting indication of unused resource for uplink transmission). For example, the device 905 or a component of the device 905 may include a processor 940 and memory 930 coupled with or to the processor 940, the processor 940 and memory 930 configured to perform various functions described herein.

The communications manager 920 may support wireless communications in accordance with examples as disclosed herein. For example, the communications manager 920 may be configured as or otherwise support a means for receiving control signaling including a first parameter that indicates a first quantity of symbol groups and a second parameter that indicates a second quantity of RB groups. The communications manager 920 may be configured as or otherwise support a means for receiving, a grant allocating periodic resources for transmitting a set of transport blocks. The communications manager 920 may be configured as or otherwise support a means for transmitting a feedback message indicating whether resources of the grant are unused by the UE to transmit one or more transport blocks of the set of transport blocks, the feedback message generated according with the first parameter and the second parameter of the control signaling.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of indication of unused resource for uplink transmission as described herein, or the processor 940 and the memory 930 may be otherwise configured to perform or support such operations.

Figure 10:
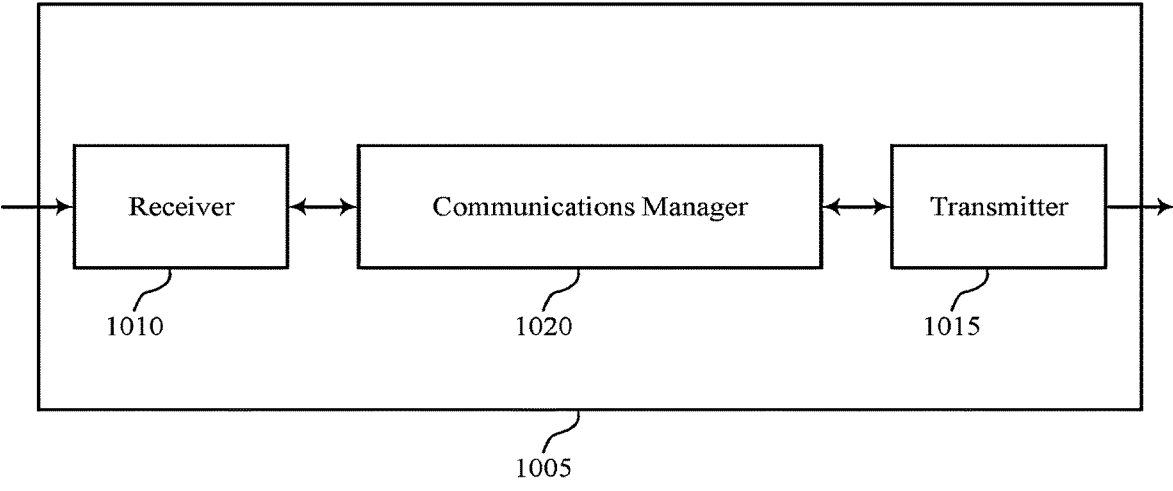
FIGS. 10 and 11 illustrate block diagrams of devices that support indication of unused resource for uplink transmission in accordance with one or more aspects of the present disclosure.

FIG. 10 illustrates a block diagram 1000 of a device 1005 that supports indication of unused resource for uplink transmission in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of indication of unused resource for uplink transmission as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver

1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 may be configured as or otherwise support a means for transmitting control signaling including a first parameter that indicates a first quantity of symbol groups and a second parameter that indicates a second quantity of RB groups. The communications manager 1020 may be configured as or otherwise support a means for transmitting, a grant allocating periodic resources for transmitting a set of transport blocks. The communications manager 1020 may be configured as or otherwise support a means for receiving a feedback message indicating whether resources of the grant are unused by a UE to transmit one or more transport blocks of the set of transport blocks, the feedback message generated according with the first parameter and the second parameter of the control signaling.

Figure 11:
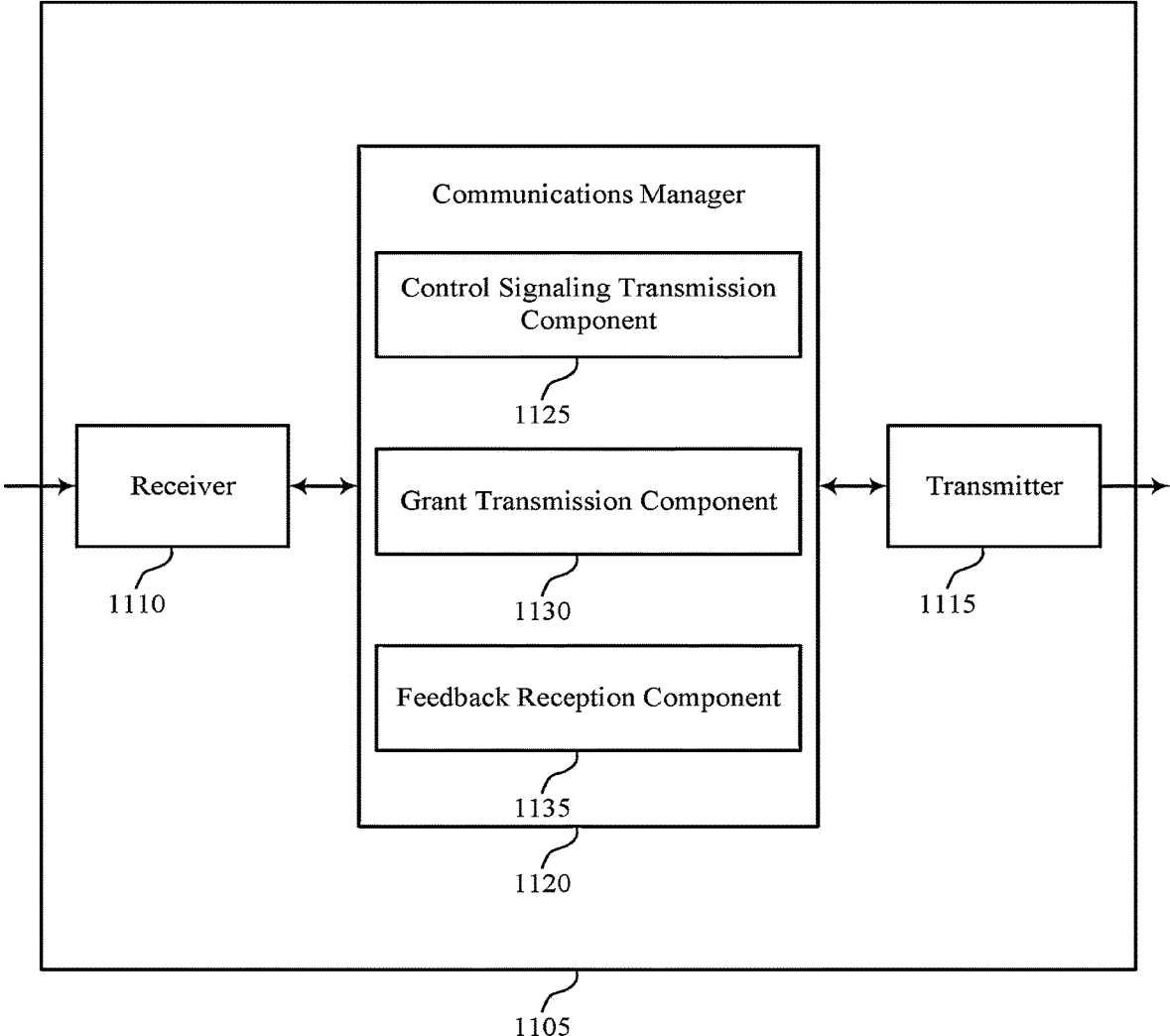

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources FIG. 11 illustrates a block diagram 1100 of a device 1105 that supports indication of unused resource for uplink transmission in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of indication of unused resource for uplink transmission as described herein. For example, the communications manager 1120 may include a control signaling transmission component 1125, a grant transmission component 1130, a feedback reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The control signaling transmission component 1125 may be configured as or otherwise support a means for transmitting control signaling including a first parameter that indicates a first quantity of symbol groups and a second parameter that indicates a second quantity of RB groups. The grant transmission component 1130 may be configured as or otherwise support a means for transmitting, a grant allocating periodic resources for transmitting a set of transport blocks. The feedback reception component 1135 may be configured as or otherwise support a means for receiving a feedback message indicating whether resources of the grant are unused by a UE to transmit one or more transport blocks of the set of transport blocks, the feedback message generated according with the first parameter and the second parameter of the control signaling.

Figure 12:
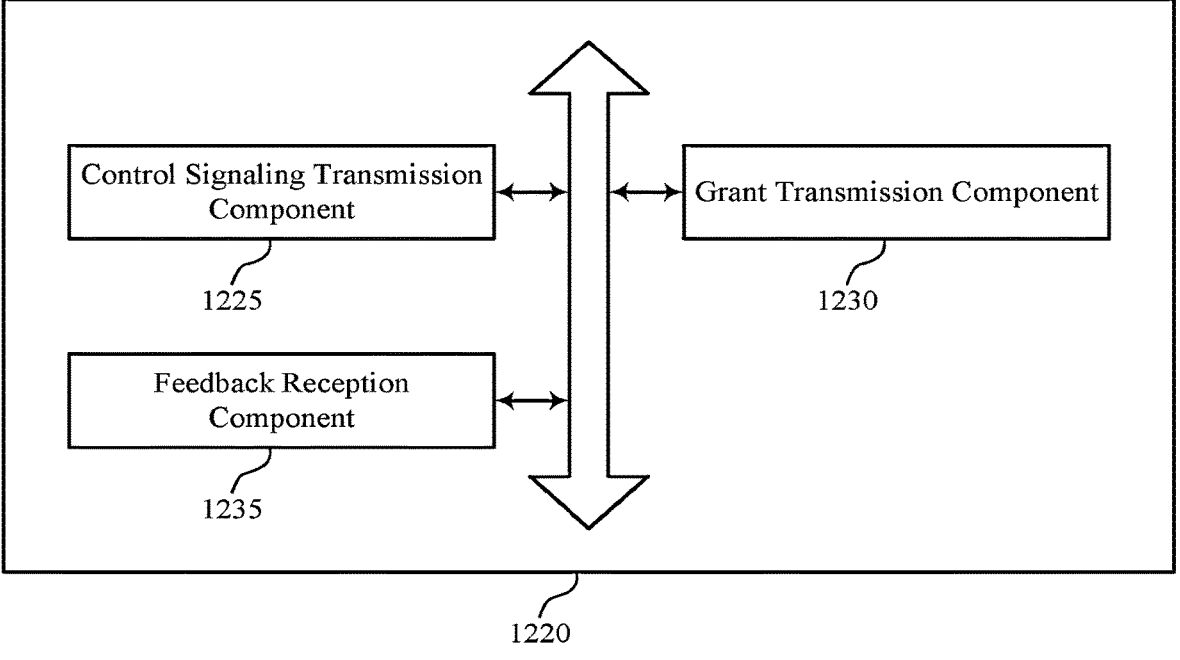
FIG. 12 illustrates a block diagram of a communications manager that supports indication of unused resource for uplink transmission in accordance with one or more aspects of the present disclosure.

FIG. 12 illustrates a block diagram 1200 of a communications manager 1220 that supports indication of unused resource for uplink transmission in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of indication of unused resource for uplink transmission as described herein. For example, the communications manager 1220 may include a control signaling transmission component 1225, a grant transmission component 1230, a feedback reception component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The control signaling transmission component 1225 may be configured as or otherwise support a means for transmitting control signaling including a first parameter that indicates a first quantity of symbol groups and a second parameter that indicates a second quantity of RB groups. The grant transmission component 1230 may be configured as or otherwise support a means for transmitting, a grant allocating periodic resources for transmitting a set of transport blocks. The feedback reception component 1235 may be configured as or otherwise support a means for receiving a feedback message indicating whether resources of the grant are unused by a UE to transmit one or more transport blocks of the set of transport blocks, the feedback message generated according with the first parameter and the second parameter of the control signaling.

In some examples, to support transmitting the control signaling, the control signaling transmission component 1225 may be configured as or otherwise support a means for transmitting, in the control signaling, a third parameter and a fourth parameter, the third parameter indicating a quantity of symbols equally split across the first quantity of symbol groups, the fourth parameter indicating a quantity of RBs equally split across the second quantity of RB groups.

In some examples, to support transmitting the control signaling, the control signaling transmission component 1225 may be configured as or otherwise support a means for transmitting, in the control signaling, a third parameter and a fourth parameter, the third parameter indicating a respective quantity of symbols included in each symbol group of the first quantity of symbol groups, the fourth parameter indicating a respective quantity of RBs included in each symbol group of the second quantity of RB groups.

In some examples, the third parameter included in the control signaling includes a first set of fields, each field of the first set of fields indicating the respective quantity of symbols included in a respective symbol group. In some examples, the fourth parameter included in the control signaling includes a second set of fields, each field of the second set of fields indicating the respective quantity of RBs included in a respective RB group.

In some examples, to support each value of the feedback message is associated with a respective index of a resource map between the resources of the grant and values of the feedback message, receiving the control signaling, the feedback reception component 1235 may be configured as or otherwise support a means for receiving, in the feedback message, each value of the feedback message associated with the resource map, where the resource map includes a range of RBs.

In some examples, to support transmitting the control signaling, the control signaling transmission component 1225 may be configured as or otherwise support a means for transmitting, in the control signaling, an offset for identifying a location of a first RB of the second quantity of RB groups relative to a reference RB.

In some examples, to support each value of the feedback message is associated with a respective index of a resource map between the resources of the grant and values of the feedback message, receiving the feedback message, the feedback reception component 1235 may be configured as or otherwise support a means for receiving, in the feedback message, each value of the feedback message associated with the resource map, where a starting symbol of the resource map is a quantity of symbols after a last symbol of the feedback message.

In some examples, the starting symbol of the resource map is a first symbol subsequent to a last symbol of the quantity of symbols.

In some examples, the starting symbol of the resource map is a first symbol of a first uplink channel occasion after a last symbol of the quantity of symbols.

In some examples, the starting symbol of the resource map is a first symbol of a first uplink channel occasion associated with a period of the periodic resources after a last symbol of the quantity of symbols.

Figure 13:
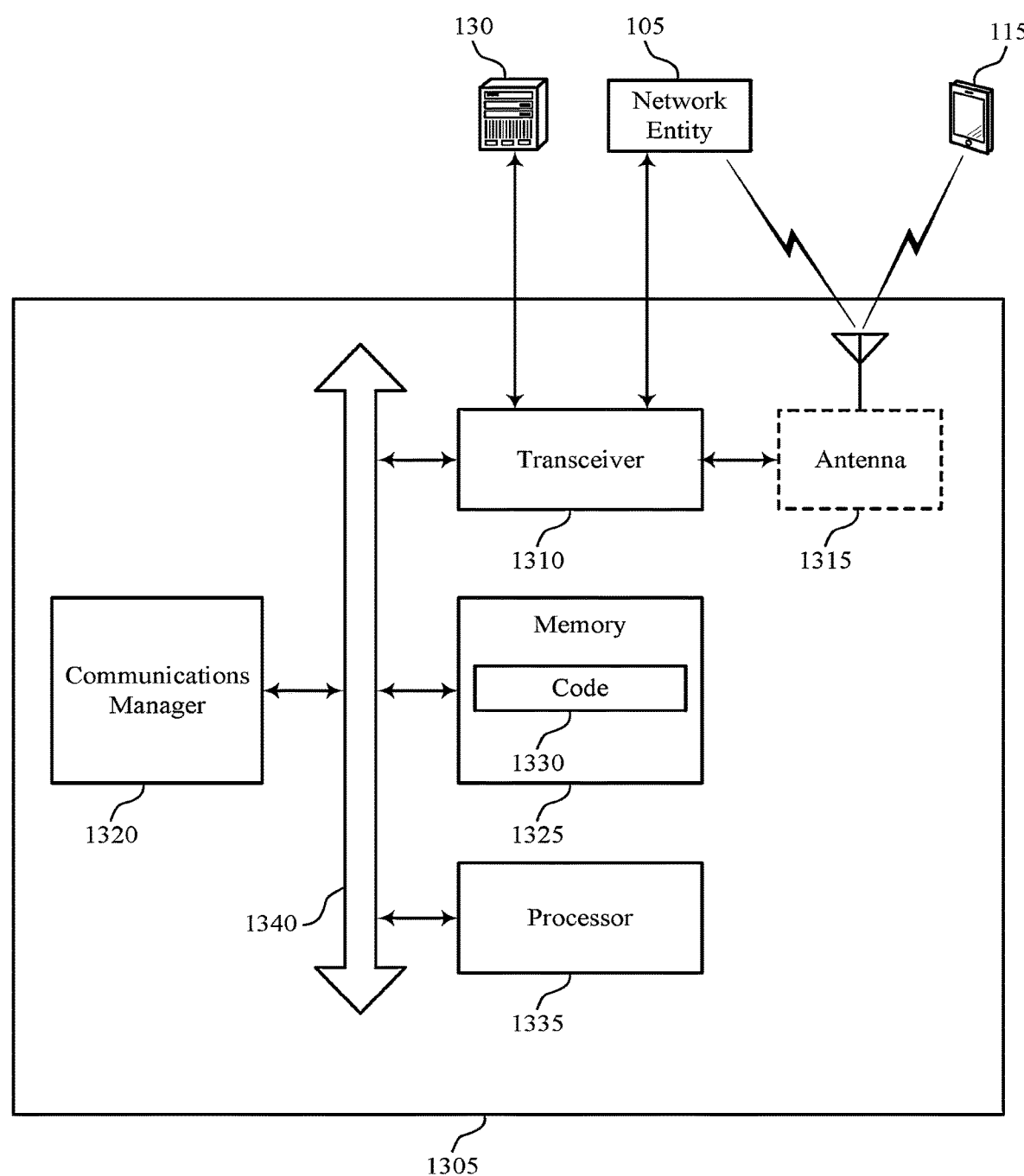
FIG. 13 illustrates a diagram of a system including a device that supports indication of unused resource for uplink transmission in accordance with one or more aspects of the present disclosure.

FIG. 13 illustrates a diagram of a system 1300 including a device 1305 that supports indication of unused resource for uplink transmission in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting indication of unused resource for uplink transmission). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 may be configured as or otherwise support a means for transmitting control signaling including a first parameter that indicates a first quantity of symbol groups and a second parameter that indicates a second quantity of RB groups. The communications manager 1320 may be configured as or otherwise support a means for transmitting, a grant allocating periodic resources for transmitting a set of transport blocks. The communications manager 1320 may be configured as or otherwise support a means for receiving a feedback message indicating whether resources of the grant are unused by a UE to transmit one or more transport blocks of the set of transport blocks, the feedback message generated according with the first parameter and the second parameter of the control signaling.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of indication of unused resource for uplink transmission as described herein, or the processor 1335 and the memory 1325 may be otherwise configured to perform or support such operations.

FIG. 14 illustrates a flowchart showing a method 1400 that supports indication of unused resource for uplink transmission in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling including a first parameter that indicates a first quantity of symbol groups and a second parameter that indicates a second quantity of RB groups. The operations of 1405 may be performed in accordance with examples as disclosed herein. In some examples, aspects of the operations of 1405 may be performed by a control signaling reception component 825 as described with reference to FIG. 8.

At 1410, the method may include receiving, a grant allocating periodic resources for transmitting a set of transport blocks. The operations of 1410 may be performed in accordance with examples as disclosed herein. In some examples, aspects of the operations of 1410 may be performed by a grant reception component 830 as described with reference to FIG. 8.

At 1415, the method may include transmitting a feedback message indicating whether resources of the grant are unused by the UE to transmit one or more transport blocks of the set of transport blocks, the feedback message generated according with the first parameter and the second parameter of the control signaling. The operations of 1415 may be performed in accordance with examples as disclosed herein. In some examples, aspects of the operations of 1415 may be performed by a feedback transmission component 835 as described with reference to FIG. 8.

FIG. 15 illustrates a flowchart showing a method 1500 that supports indication of unused resource for uplink transmission in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling including a first parameter that indicates a first quantity of symbol groups and a second parameter that indicates a second quantity of RB groups. The operations of 1505 may be performed in accordance with examples as disclosed herein. In some examples, aspects of the operations of 1505 may be performed by a control signaling reception component 825 as described with reference to FIG. 8.

At 1510, the method may include receiving, in the control signaling, a third parameter and a fourth parameter, the third parameter indicating a quantity of symbols equally split across the first quantity of symbol groups, the fourth parameter indicating a quantity of RBs equally split across the second quantity of RB groups. The operations of 1510 may be performed in accordance with examples as disclosed herein. In some examples, aspects of the operations of 1510 may be performed by a control signaling reception component 825 as described with reference to FIG. 8.

At 1515, the method may include receiving, a grant allocating periodic resources for transmitting a set of transport blocks. The operations of 1515 may be performed in accordance with examples as disclosed herein. In some examples, aspects of the operations of 1515 may be performed by a grant reception component 830 as described with reference to FIG. 8.

At 1520, the method may include transmitting a feedback message indicating whether resources of the grant are unused by the UE to transmit one or more transport blocks of the set of transport blocks, the feedback message generated according with the first parameter and the second parameter of the control signaling. The operations of 1520 may be performed in accordance with examples as disclosed herein. In some examples, aspects of the operations of 1520 may be performed by a feedback transmission component 835 as described with reference to FIG. 8.

FIG. 16 illustrates a flowchart showing a method 1600 that supports indication of unused resource for uplink transmission in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling including a first parameter that indicates a first quantity of symbol groups and a second parameter that indicates a second quantity of RB groups. The operations of 1605 may be performed in accordance with examples as disclosed herein. In some examples, aspects of the operations of 1605 may be performed by a control signaling transmission component 1225 as described with reference to FIG. 12.

At 1610, the method may include transmitting, a grant allocating periodic resources for transmitting a set of transport blocks. The operations of 1610 may be performed in accordance with examples as disclosed herein. In some examples, aspects of the operations of 1610 may be performed by a grant transmission component 1230 as described with reference to FIG. 12.

At 1615, the method may include receiving a feedback message indicating whether resources of the grant are unused by a UE to transmit one or more transport blocks of the set of transport blocks, the feedback message generated according with the first parameter and the second parameter of the control signaling. The operations of 1615 may be performed in accordance with examples as disclosed herein. In some examples, aspects of the operations of 1615 may be performed by a feedback reception component 1235 as described with reference to FIG. 12.

FIG. 17 illustrates a flowchart showing a method 1700 that supports indication of unused resource for uplink transmission in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling including a first parameter that indicates a first quantity of symbol groups and a second parameter that indicates a second quantity of RB groups. The operations of 1705 may be performed in accordance with examples as disclosed herein. In some examples, aspects of the operations of 1705 may be performed by a control signaling transmission component 1225 as described with reference to FIG. 12.

At 1710, the method may include transmitting, in the control signaling, a third parameter and a fourth parameter, the third parameter indicating a quantity of symbols equally split across the first quantity of symbol groups, the fourth parameter indicating a quantity of RBs equally split across the second quantity of RB groups. The operations of 1710 may be performed in accordance with examples as disclosed herein. In some examples, aspects of the operations of 1710 may be performed by a control signaling transmission component 1225 as described with reference to FIG. 12.

At 1715, the method may include transmitting, a grant allocating periodic resources for transmitting a set of transport blocks. The operations of 1715 may be performed in accordance with examples as disclosed herein. In some examples, aspects of the operations of 1715 may be performed by a grant transmission component 1230 as described with reference to FIG. 12.

At 1720, the method may include receiving a feedback message indicating whether resources of the grant are unused by a UE to transmit one or more transport blocks of the set of transport blocks, the feedback message generated according with the first parameter and the second parameter of the control signaling. The operations of 1720 may be performed in accordance with examples as disclosed herein. In some examples, aspects of the operations of 1720 may be performed by a feedback reception component 1235 as described with reference to FIG. 12.

The following provides an overview of aspects of the present disclosure:

Aspect 1: A method for wireless communications, at a UE, comprising: receiving control signaling comprising a first parameter that indicates a first quantity of symbol groups and a second parameter that indicates a second quantity of RB groups; receiving, a grant allocating periodic resources for transmitting a set of transport blocks; and transmitting a feedback message indicating whether resources of the grant are unused by the UE to transmit one or more transport blocks of the set of transport blocks, the feedback message generated according with the first parameter and the second parameter of the control signaling.

Aspect 2: The method of aspect 1, wherein receiving the control signaling comprises: receiving, in the control signaling, a third parameter and a fourth parameter, the third parameter indicating a quantity of symbols equally split across the first quantity of symbol groups, the fourth parameter indicating a quantity of RBs equally split across the second quantity of RB groups.

Aspect 3: The method of any of aspects 1 through 2, wherein receiving the control signaling comprises: receiving, in the control signaling, a third parameter and a fourth parameter, the third parameter indicating a respective quantity of symbols comprised in each symbol group of the first quantity of symbol groups, the fourth parameter indicating a respective quantity of RBs comprised in each symbol group of the second quantity of RB groups.

Aspect 4: The method of aspect 3, wherein the third parameter included in the control signaling comprises a first set of fields, each field of the first set of fields indicating the respective quantity of symbols comprised in a respective symbol group; and the fourth parameter included in the control signaling comprises a second set of fields, each field of the second set of fields indicating the respective quantity of RBs comprised in a respective RB group.

Aspect 5: The method of any of aspects 1 through 4, wherein each value of the feedback message is associated with a respective index of a resource map between the resources of the grant and values of the feedback message, transmitting the feedback message comprises: transmitting, in the feedback message, each value of the feedback message associated with the resource map, wherein the resource map comprises a range of RBs.

Aspect 6: The method of any of aspects 1 through 5, wherein receiving the control signaling comprises: receiving, in the control signaling, an offset for identifying a location of a first RB of the second quantity of RB groups relative to a reference RB.

Aspect 7: The method of any of aspects 1 through 6, wherein each value of the feedback message is associated with a respective index of a resource map between the resources of the grant and values of the feedback message, transmitting the feedback message comprises: transmitting, in the feedback message, each value of the feedback message associated with the resource map, wherein a starting symbol of the resource map is a quantity of symbols after a last symbol of the feedback message.

Aspect 8: The method of aspect 7, wherein the starting symbol of the resource map is a first symbol subsequent to a last symbol of the quantity of symbols.

Aspect 9: The method of any of aspects 7 through 8, wherein the starting symbol of the resource map is a first symbol of a first uplink channel occasion after a last symbol of the quantity of symbols.

Aspect 10: The method of any of aspects 7 through 9, wherein the starting symbol of the resource map is a first symbol of a first uplink channel occasion associated with a period of the periodic resources after a last symbol of the quantity of symbols.

Aspect 11: The method of any of aspects 7 through 10, wherein receiving the control signaling comprises: receiving, in the control signaling, an indication of the quantity of symbols.

Aspect 12: The method of any of aspects 1 through 11, wherein each value of the feedback message is associated with a symbol group of the first quantity of symbol groups and a RB group of the second quantity of RB groups, a value of a first type indicating that the associated symbol group and RB group are used by the UE to transmit the one or more transport blocks, a value of a second type indicating that the associated symbol group and RB group are not used by the UE to transmit the one or more transport blocks.

Aspect 13: The method of aspect 12, wherein an uplink channel occasion overlaps with a first symbol group and a first RB group associated with a value of the second type, the value of the second type indicates that the UE does not use any resources of the first RB group during symbols associated with the uplink channel occasion to transmit the one or more transport blocks.

Aspect 14: The method of any of aspects 12 through 13, wherein an uplink channel occasion overlaps with a first symbol group and a first RB group associated with a value of the second type, the value of the second type indicates that the UE does not use the resources of the first RB group in the first symbol group to transmit the one or more transport blocks during the uplink channel occasion.

Aspect 15: The method of any of aspects 12 through 14, wherein an uplink channel occasion overlaps with a first symbol group and a first RB group associated with a value of the second type, the value of the second type indicates that the UE does not use any RBs associated with the first symbol group to transmit the one or more transport blocks.

Aspect 16: The method of any of aspects 12 through 15, wherein an uplink channel occasion overlaps with a first symbol group and a first RB group associated with a value of the second type, the value of the second type indicates that the UE does not use the first RB group to transmit the one or more transport blocks during symbols of the first symbol group.

Aspect 17: The method of any of aspects 12 through 16, wherein an uplink channel occasion overlaps with a first symbol group and a first RB group associated with a value of the second type, the value of the second type indicates that the UE does not use the first RB group or RBs associated with a higher RB index to transmit the one or more transport blocks during symbols of the first symbol group.

Aspect 18: The method of any of aspects 1 through 17, wherein transmitting the feedback message comprises: transmitting the feedback message via a physical uplink shared channel or a physical uplink control channel.

Aspect 19: A method for wireless communications, at a network entity, comprising: transmitting control signaling comprising a first parameter that indicates a first quantity of symbol groups and a second parameter that indicates a second quantity of RB groups; transmitting, a grant allocating periodic resources for transmitting a set of transport blocks; and receiving a feedback message indicating whether resources of the grant are unused by a UE to transmit one or more transport blocks of the set of transport blocks, the feedback message generated according with the first parameter and the second parameter of the control signaling.

Aspect 20: The method of aspect 19, wherein transmitting the control signaling comprises: transmitting, in the control signaling, a third parameter and a fourth parameter, the third parameter indicating a quantity of symbols equally split across the first quantity of symbol groups, the fourth parameter indicating a quantity of RBs equally split across the second quantity of RB groups.

Aspect 21: The method of any of aspects 19 through 20, wherein transmitting the control signaling comprises: transmitting, in the control signaling, a third parameter and a fourth parameter, the third parameter indicating a respective quantity of symbols comprised in each symbol group of the first quantity of symbol groups, the fourth parameter indicating a respective quantity of RBs comprised in each symbol group of the second quantity of RB groups.

Aspect 22: The method of aspect 21, wherein the third parameter included in the control signaling comprises a first set of fields, each field of the first set of fields indicating the respective quantity of symbols comprised in a respective symbol group; and the fourth parameter included in the control signaling comprises a second set of fields, each field of the second set of fields indicating the respective quantity of RBs comprised in a respective RB group.

Aspect 23: The method of any of aspects 19 through 22, wherein each value of the feedback message is associated with a respective index of a resource map between the resources of the grant and values of the feedback message, receiving the control signaling comprises: receiving, in the feedback message, each value of the feedback message associated with the resource map, wherein the resource map comprises a range of RBs.

Aspect 24: The method of any of aspects 19 through 23, wherein transmitting the control signaling comprises: transmitting, in the control signaling, an offset for identifying a location of a first RB of the second quantity of RB groups relative to a reference RB.

Aspect 25: The method of any of aspects 19 through 24, wherein each value of the feedback message is associated with a respective index of a resource map between the resources of the grant and values of the feedback message, receiving the feedback message comprises: receiving, in the feedback message, each value of the feedback message associated with the resource map, wherein a starting symbol of the resource map is a quantity of symbols after a last symbol of the feedback message.

Aspect 26: The method of aspect 25, wherein the starting symbol of the resource map is a first symbol subsequent to a last symbol of the quantity of symbols.

Aspect 27: The method of any of aspects 25 through 26, wherein the starting symbol of the resource map is a first symbol of a first uplink channel occasion after a last symbol of the quantity of symbols.

Aspect 28: The method of any of aspects 25 through 27, wherein the starting symbol of the resource map is a first symbol of a first uplink channel occasion associated with a period of the periodic resources after a last symbol of the quantity of symbols.

Aspect 29: An apparatus for wireless communications, comprising a processor; memory coupled with the processor; and instructions stored in the memory and executable by the processor to cause the apparatus to perform a method of any of aspects 1 through 18.

Aspect 30: An apparatus for wireless communications, comprising at least one means for performing a method of any of aspects 1 through 18.

Aspect 31: A non-transitory computer-readable medium storing code for wireless communications, the code comprising instructions executable by a processor to perform a method of any of aspects 1 through 18.

Aspect 32: An apparatus for wireless communications, comprising a processor; memory coupled with the processor; and instructions stored in the memory and executable by the processor to cause the apparatus to perform a method of any of aspects 19 through 28.

Aspect 33: An apparatus for wireless communications, comprising at least one means for performing a method of any of aspects 19 through 28.

Aspect 34: A non-transitory computer-readable medium storing code for wireless communications, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
   a processor;
   memory coupled with the processor; and
   instructions stored in the memory and executable by the processor to cause the apparatus to:
      receive control signaling comprising a first parameter that indicates a first quantity of symbol groups, a second parameter that indicates a second quantity of resource block groups, a third parameter that indicates a quantity of symbols of the first quantity of symbol groups, and a fourth parameter that indicates a quantity of resource blocks of the resource block groups;
      receive, a grant allocating periodic resources for transmitting a set of transport blocks; and
      transmit a feedback message indicating whether resources of the grant are unused by the apparatus to transmit one or more transport blocks of the set of transport blocks, the feedback message generated according with the first parameter and the second parameter of the control signaling.

2. The apparatus of claim 1, wherein:
   the third parameter indicates the quantity of symbols that are equally split across the first quantity of symbol groups, the fourth parameter indicates the quantity of resource blocks that are equally split across the second quantity of resource block groups.

3. The apparatus of claim 1, wherein:
   the third parameter indicates a respective quantity of symbols comprised in each symbol group of the first quantity of symbol groups, the fourth parameter indicates a respective quantity of resource blocks comprised in each symbol group of the second quantity of resource block groups.

4. The apparatus of claim 3, wherein:
   the third parameter included in the control signaling comprises a first set of fields, each field of the first set of fields indicating the respective quantity of symbols comprised in a respective symbol group; and
   the fourth parameter included in the control signaling comprises a second set of fields, each field of the second set of fields indicating the respective quantity of resource blocks comprised in a respective resource block group.

5. The apparatus of claim 1, wherein each value of the feedback message be associated with a respective index of a resource map between the resources of the grant and values of the feedback message, the instructions to transmit the feedback message are executable by the processor to cause the apparatus to:

transmit, in the feedback message, each value of the feedback message associated with the resource map, wherein the resource map comprises a range of resource blocks.

6. The apparatus of claim 1, wherein the instructions to receive the control signaling are executable by the processor to cause the apparatus to:

receive, in the control signaling, an offset for identifying a location of a first resource block of the second quantity of resource block groups relative to a reference resource block.

7. The apparatus of claim 1, wherein each value of the feedback message be associated with a respective index of a resource map between the resources of the grant and values of the feedback message, the instructions to transmit the feedback message are executable by the processor to cause the apparatus to:

transmit, in the feedback message, each value of the feedback message associated with the resource map, wherein a starting symbol of the resource map is a quantity of symbols after a last symbol of the feedback message.

8. The apparatus of claim 7, wherein the starting symbol of the resource map is a first symbol subsequent to a last symbol of the quantity of symbols.

9. The apparatus of claim 7, wherein the starting symbol of the resource map is a first symbol of a first uplink channel occasion after a last symbol of the quantity of symbols.

10. The apparatus of claim 7, wherein the starting symbol of the resource map is a first symbol of a first uplink channel occasion associated with a period of the periodic resources after a last symbol of the quantity of symbols.

11. The apparatus of claim 7, wherein the instructions to receive the control signaling are executable by the processor to cause the apparatus to:

receive, in the control signaling, an indication of the quantity of symbols.

12. The apparatus of claim 1, wherein each value of the feedback message is associated with a symbol group of the first quantity of symbol groups and a resource block group of the second quantity of resource block groups, a value of a first type indicating that the associated symbol group and resource block group are used by the apparatus to transmit the one or more transport blocks, a value of a second type indicating that the associated symbol group and resource block group are not used by the apparatus to transmit the one or more transport blocks.

13. The apparatus of claim 12, wherein an uplink channel occasion overlaps with a first symbol group and a first resource block group associated with a value of the second type, the value of the second type indicates that the apparatus does not use any resources of the first resource block group during symbols associated with the uplink channel occasion to transmit the one or more transport blocks.

14. The apparatus of claim 12, wherein an uplink channel occasion overlaps with a first symbol group and a first resource block group associated with a value of the second type, the value of the second type indicates that the apparatus does not use the resources of the first resource block group in the first symbol group to transmit the one or more transport blocks during the uplink channel occasion.

15. The apparatus of claim 12, wherein an uplink channel occasion overlaps with a first symbol group and a first resource block group associated with a value of the second type, the value of the second type indicates that the apparatus does not use any resource blocks associated with the first symbol group to transmit the one or more transport blocks.

16. The apparatus of claim 12, wherein an uplink channel occasion overlaps with a first symbol group and a first resource block group associated with a value of the second type, the value of the second type indicates that the apparatus does not use the first resource block group to transmit the one or more transport blocks during symbols of the first symbol group.

17. The apparatus of claim 12, wherein an uplink channel occasion overlaps with a first symbol group and a first resource block group associated with a value of the second type, the value of the second type indicates that the apparatus does not use the first resource block group or resource blocks associated with a higher resource block index to transmit the one or more transport blocks during symbols of the first symbol group.

18. The apparatus of claim 1, wherein the instructions to transmit the feedback message are executable by the processor to cause the apparatus to:

transmit the feedback message via a physical uplink shared channel or a physical uplink control channel.

19. An apparatus for wireless communications, comprising:

a processor;

memory coupled with the processor; and instructions stored in the memory and executable by the processor to cause the apparatus to:

transmit control signaling comprising a first parameter that indicates a first quantity of symbol groups, a second parameter that indicates a second quantity of resource block groups, a third parameter that indicates a quantity of symbols of the first quantity of symbol groups, and a fourth parameter that indicates a quantity of resource blocks of the resource block groups;

transmit, a grant allocating periodic resources for transmitting a set of transport blocks; and receive a feedback message indicating whether resources of the grant are unused by a user equipment (UE) to transmit one or more transport blocks of the set of transport blocks, the feedback message generated according with the first parameter and the second parameter of the control signaling.

20. The apparatus of claim 19, wherein:

the third parameter indicates the quantity of symbols that are equally split across the first quantity of symbol groups, the fourth parameter indicates the quantity of resource blocks that are equally split across the second quantity of resource block groups.

21. The apparatus of claim 19, wherein:

the third parameter indicates a respective quantity of symbols comprised in each symbol group of the first quantity of symbol groups, the fourth parameter indicates a respective quantity of resource blocks comprised in each symbol group of the second quantity of resource block groups.

22. The apparatus of claim 21, wherein:

the third parameter included in the control signaling comprises a first set of fields, each field of the first set of fields indicating the respective quantity of symbols comprised in a respective symbol group; and the fourth parameter included in the control signaling comprises a second set of fields, each field of the second set of fields indicating the respective quantity of resource blocks comprised in a respective resource block group.

23. The apparatus of claim 19, wherein each value of the feedback message be associated with a respective index of a resource map between the resources of the grant and values of the feedback message, the instructions to receive the control signaling are executable by the processor to cause the apparatus to:

receive, in the feedback message, each value of the feedback message associated with the resource map, wherein the resource map comprises a range of resource blocks.

24. The apparatus of claim 19, wherein the instructions to transmit the control signaling are executable by the processor to cause the apparatus to:

transmit, in the control signaling, an offset for identifying a location of a first resource block of the second quantity of resource block groups relative to a reference resource block.

25. The apparatus of claim 19, wherein each value of the feedback message be associated with a respective index of a resource map between the resources of the grant and values of the feedback message, the instructions to receive the feedback message are executable by the processor to cause the apparatus to:

receive, in the feedback message, each value of the feedback message associated with the resource map, wherein a starting symbol of the resource map is a quantity of symbols after a last symbol of the feedback message.

26. The apparatus of claim 25, wherein the starting symbol of the resource map is a first symbol subsequent to a last symbol of the quantity of symbols.

27. The apparatus of claim 25, wherein the starting symbol of the resource map is a first symbol of a first uplink channel occasion after a last symbol of the quantity of symbols.

28. The apparatus of claim 25, wherein the starting symbol of the resource map is a first symbol of a first uplink channel occasion associated with a period of the periodic resources after a last symbol of the quantity of symbols.

29. A method for wireless communications, at a user equipment (UE), comprising:

receiving control signaling comprising a first parameter that indicates a first quantity of symbol groups, a second parameter that indicates a second quantity of resource block groups, a third parameter that indicates a quantity of symbols of the first quantity of symbol groups, and a fourth parameter that indicates a quantity of resource blocks of the resource block groups;

receiving, a grant allocating periodic resources for transmitting a set of transport blocks; and transmitting a feedback message indicating whether resources of the grant are unused by the UE to transmit one or more transport blocks of the set of transport blocks, the feedback message generated according with the first parameter and the second parameter of the control signaling.

30. A method for wireless communications, at a network entity, comprising:

transmitting control signaling comprising a first parameter that indicates a first quantity of symbol groups, a second parameter that indicates a second quantity of resource block groups, a third parameter that indicates a quantity of symbols of the first quantity of symbols groups, and a fourth parameter that indicates a quantity of resource blocks of the resource block groups;

transmitting, a grant allocating periodic resources for transmitting a set of transport blocks; and receiving a feedback message indicating whether resources of the grant are unused by a user equipment (UE) to transmit one or more transport blocks of the set of transport blocks, the feedback message generated according with the first parameter and the second parameter of the control signaling.

* * * * *